United States Patent
Munshi et al.

(10) Patent No.: US 12,337,376 B2
(45) Date of Patent: Jun. 24, 2025

(54) METHOD FOR PRODUCING AN ARTICLE FOR USE IN THE FOUNDRY INDUSTRY, CORRESPONDING MOLD, CORE, FEED ELEMENT, OR MOLDING MATERIAL MIXTURE, AND DEVICES AND USES

(71) Applicant: HÜTTENES-ALBERTUS Chemische Werke Gesellschaft mit beschränkter Haftung, Düsseldorf (DE)

(72) Inventors: Azghar Munshi, Castelgomberto (IT); René Vargovic, Wunstorf (DE); Lukas Mirko Reinold, Hannover (DE); Maria Schweinefuss, Hannover (DE)

(73) Assignee: HÜTTENES-ALBERTUS CHEMISCHE WERKE GESELLSCHAFT MIT BESCHRÄNKTER HAFTUNG, Düsseldorf (DE)

( * ) Notice: Subject to any disclaimer, the term of this patent is extended or adjusted under 35 U.S.C. 154(b) by 0 days.

(21) Appl. No.: 18/005,411

(22) PCT Filed: Jul. 12, 2021

(86) PCT No.: PCT/EP2021/069276
§ 371 (c)(1),
(2) Date: Jan. 13, 2023

(87) PCT Pub. No.: WO2022/013129
PCT Pub. Date: Jan. 20, 2022

(65) Prior Publication Data
US 2023/0271245 A1 Aug. 31, 2023

(30) Foreign Application Priority Data
Jul. 17, 2020 (DE) .......................... 102020119013.1

(51) Int. Cl.
B22C 1/18 (2006.01)
B22C 11/00 (2006.01)

(52) U.S. Cl.
CPC .............. B22C 1/181 (2013.01); B22C 11/00 (2013.01)

(58) Field of Classification Search
CPC ............ B22C 1/18; B22C 1/181; B22C 11/00
USPC ................... 164/6, 15, 23, 33, 37, 525, 528; 106/38.9
See application file for complete search history.

(56) References Cited

U.S. PATENT DOCUMENTS

| | | | |
|---|---|---|---|
| 3,203,057 | A | 8/1965 | Hunt |
| 4,432,798 | A | 2/1984 | Helferich |
| 5,743,953 | A | 4/1998 | Twardowska |
| 2008/0099180 | A1 | 5/2008 | Weicker |
| 2010/0224756 | A1 | 9/2010 | Muller |
| 2010/0294454 | A1 | 11/2010 | Muller |
| 2010/0326620 | A1 | 12/2010 | Mueller |
| 2012/0196736 | A1 | 8/2012 | Bohlander |
| 2014/0212677 | A1 | 7/2014 | Gnüchtel |
| 2015/0246387 | A1 | 9/2015 | Bartels |
| 2015/0315083 | A1 | 11/2015 | Deters |
| 2016/0121388 | A1 | 5/2016 | Aoki |
| 2016/0136724 | A1 | 5/2016 | Deters |
| 2016/0361756 | A1 | 12/2016 | Deters |
| 2017/0320128 | A1 | 11/2017 | Deters |
| 2021/0107055 | A1 | 4/2021 | Reinold |

FOREIGN PATENT DOCUMENTS

| | | | |
|---|---|---|---|
| CN | 109562997 A | * 4/2019 | ........... C04B 28/005 |
| CZ | 2016459 | 1/2018 | |
| DE | 2262254 | 6/1974 | |
| DE | 19738373 | 3/1999 | |
| DE | 102007045649 | 4/2009 | |
| DE | 102012020510 | 4/2014 | |
| EP | 0763506 | 3/1997 | |
| EP | 3225327 | 10/2017 | |
| GB | 1029057 | 5/1966 | |

OTHER PUBLICATIONS

Machine translation of CN 109562997 A (Year: 2019).*

(Continued)

*Primary Examiner* — Kevin P Kerns
(74) *Attorney, Agent, or Firm* — DUANE MORRIS LLP; Gregory M. Lefkowitz; Brandon A. Chan

(57) ABSTRACT

What is described is a process for producing an article for use in the foundry industry selected from molds, cores, feeder elements and molding material mixtures, and includes the following steps: (S1) producing or providing a binder system with the following components in three spatially separate vessels: a component (A) particulate amorphous silicon dioxide, a first liquid component (B) waterglass, and a second liquid component (C) aluminate ions dissolved in an aqueous phase, (S2) contacting a mold base material (D) and constituents of all the components (A), (B) and (C) of the binder system in predetermined ratios in one or more steps, so as to result in a molding material mixture in which the aluminate ions and the particulate amorphous silicon dioxide are mixed wholly or partly into the waterglass, wherein steps (S1) and (S2) are conducted in a facility for producing molding material mixtures. Also described are a corresponding molding material mixture and apparatuses and uses.

11 Claims, No Drawings

(56) References Cited

OTHER PUBLICATIONS

Friede, B., et al., "Mikrosilica—ein Staub macht Karriere", Nachr. Chem., (2011). vol. 59, pp. 956-958 with English machine translation.

Bührig-Polaczek, A., et al., "Handbuch Urformen [Handbook of Production Engineering]" Carl Hanser Verlag GmbH & Co. KG, Munich 2014, chapters 1.5.3 with English machine translation.

Vykoukala, M., et al., "Geopol®. The Innovated Environment Friendly Inorganic Binder System," Archives of Foundry Engineering, vol. 19, Issue Jan. 2019, 109-116 (Mar. 2019).

* cited by examiner

METHOD FOR PRODUCING AN ARTICLE FOR USE IN THE FOUNDRY INDUSTRY, CORRESPONDING MOLD, CORE, FEED ELEMENT, OR MOLDING MATERIAL MIXTURE, AND DEVICES AND USES

CROSS-REFERENCE TO RELATED APPLICATIONS

This application is a § 371 national stage entry of International Application No. PCT/EP2021/069276, filed on Jul. 12, 2021, which claims priority to German Patent Application No. 102020119013.1, filed on Jul. 17, 2020, the entire contents of which are incorporated herein by reference.

BACKGROUND OF THE INVENTION

The present invention relates to a process for producing an article for use in the foundry industry, selected from the group consisting of molds, cores, feeder elements and molding material mixtures. Further details of the process of the invention will be apparent from the appended claims and from the description that follows. The present invention additionally relates to corresponding molds, cores, feeder elements and molding material mixtures. The present invention moreover relates to an apparatus for performance of the process of the invention, and to a corresponding use of an apparatus of the invention for performance of a process of the invention. The present invention additionally relates to the use of a liquid component comprising aluminate ions dissolved in an aqueous phase as a second liquid component of a curable binder system for increasing the moisture resistance of a molding comprising a mold base material bound by the cured binder system. The present invention also relates to the use of a liquid component comprising aluminate ions dissolved in an aqueous phase for production of an article by a process of the invention. The invention additionally relates to the use of a component comprising particulate amorphous silicon dioxide, a first liquid component and a second liquid component for production of a binder. Details of each will be apparent from the appended claims and the description that follows.

Casting in a lost mold is a widely used process for producing near-net-shape components. After the casting, the mold is destroyed, and the cast part is removed. Lost molds are casting molds and hence negatives; they contain the cavity to be cast that results in the finished cast part. The inner contours of the future cast part are formed by cores. In the production of the casting mold, a model of the cast part to be manufactured forms the cavity in the molding material. Reference is made to relevant details in paragraphs to of document DE 10 2017 107 531 A1.

Document DE 10 2012 020 509 A1 discloses a molding material mixture for production of casting molds and cores for metal processing, comprising at least: a refractory mold base material; an inorganic binder and particulate amorphous $SiO_2$, producible by thermal breakdown of $ZrSiO_4$ to give $ZrO_2$ and $SiO_2$. In addition, DE 10 2012 020 509 A1 discloses that the molding material mixture may comprise an inorganic binder, for example based on waterglass.

Document DE 10 2013 111 626 A1 discloses a molding material mixture for production of molds or cores, at least comprising: a refractory mold base material, waterglass as binder, particulate amorphous silicon dioxide and one or more powdery oxidic boron compounds. The document additionally discloses that the addition of boron compounds to the molding material mixture improves the moisture stability of the cores produced therewith.

Document DE 10 2013 106 276 A1 discloses a molding material mixture for production of casting molds and cores for metal processing, comprising at least: a refractory mold base material; and particulate amorphous $SiO_2$ and waterglass as organic binder having a molar $[SiO_2]/[M_2O]$ ratio of 1.9 to 2.60, preferably 1.95 to 2.40 and more preferably from 2 to 2.30. Lithium compounds where the molar $[Li_2O]/[M_2O]$ or $[Li_2O_{active}]/[M_2O]$ ratio in the molding material mixture is from 0.030 to 0.17, preferably 0.035 to 0.16 and more preferably from 0.040 to 0.14. The document additionally discloses that the addition of lithium compounds to the molding material mixture improves the moisture stability of the moldings produced therewith.

Document EP 1 802 409 B1 discloses a molding material mixture for production of casting molds for metal processing, at least comprising: a refractory mold base material, a waterglass-based binder, characterized in that a proportion of a particulate synthetic amorphous silicon dioxide has been added to the molding material mixture; paragraph states that the addition of silane has a positive effect on strengths, particularly with regard to resistance to high humidity.

Document EP 2 209 572 B1 discloses a molding material mixture for production of casting molds for metal processing, at least comprising: a refractory mold base material; a waterglass-based binder; a proportion of a particulate metal oxide selected from the group of silicon dioxide, aluminum oxide, titanium oxide and zinc oxide, wherein a proportion of at least one surfactant has been added to the molding material mixture. According to paragraph of document EP 2 209 572 B1, it is possible through the addition both of amorphous silicon dioxide and of surface-active substances to observe a simultaneous increase in hot strength and core weight, although cold strengths and moisture stability are also advantageous.

Document EP 2 104 580 B1 discloses a molding material mixture for production of casting molds for metal processing, at least comprising: a refractory mold base material; a waterglass-based binder; a proportion of a particulate metal oxide selected from the group of silicon dioxide, aluminum oxide, titanium oxide and zinc oxide, wherein a carbohydrate has been added to the molding material mixture. Paragraph of document EP 2 104 580 B1 discloses that the addition of carbohydrate compounds, especially of dextrin compounds, surprisingly leads to an increase in hot strength; in addition, improved storage stability of the cores produced is reported.

The prior art thus already discloses waterglass-based molding material mixtures. It is also known that, proceeding from particular base formulations, the addition of additives, especially of lithium- or boron-containing compounds, can improve the moisture resistance (moisture stability) of the moldings produced therewith.

There is a general need in the technical field of the present invention for molding material mixtures from which moldings (casting molds, cores or feeder elements) having good moisture resistance are producible.

To date, lithium compounds and boron compounds in particular have been used in the production of moldings having elevated moisture stability.

However, the use of lithium compounds is perceived to be problematic in many cases in the field of the foundry industry on account of the associated high costs and limited availability. The use of lithium compounds in molding material mixtures additionally leads in many cases to a deterioration in the cast surfaces of metal parts that are obtained in the casting of moldings (by comparison with an otherwise identical molding material mixture or otherwise identical molding without lithium compounds); this is manifested particularly in penetration or sand adhesion.

The use of boron-containing compounds in molding material mixtures in the field of the foundry industry is also increasingly being regarded as disadvantageous since boron compounds (e.g. borax) are classified as reproduction-toxic.

There is therefore a particular need in the field of the foundry industry for molding material mixtures from which it is possible to produce moldings (casting molds, cores or feeder elements) that have good moisture resistance, and the constituents of which comprise extremely small amounts at most, if any, of lithium- or boron-containing compounds.

In addition, there is a need in the field of the foundry industry for molding material mixtures from which it is possible to produce moldings (casting molds, cores or feeder elements) that have even more advantageous moisture resistance than the moldings (casting molds, cores or feeder elements) produced from the known molding material mixtures comprising lithium compounds or boron compounds.

More particularly, there is a need in the field of the foundry industry for molding material mixtures from which it is possible to produce moldings or cores that simultaneously have an advantageously high relative molding weight (core weight in the case of cores) and advantageously good moisture resistance.

More particularly, there is a need in the field of the foundry industry for molding material mixtures from which it is possible to produce moldings or cores that simultaneously have an advantageously high relative molding weight (core weight in the case of cores) and advantageously good moisture resistance, resulting in a high surface quality of the cast metal parts obtained when they are cast, in particular when they are cast with molten aluminum or molten aluminum alloys.

More particularly, there is a need for such molding material mixtures that meet all or some of the aforementioned demands and can be produced in a resource-efficient manner in the foundry.

Moreover, there is a growing need for an energy-efficient and environmentally conserving use of resources in the field of the present invention.

SUMMARY OF THE INVENTION

The present invention relates to:
a process for producing an article for use in the foundry industry, selected from the group consisting of molds, cores, feeder elements and molding material mixtures,
molds, cores, feeder elements or molding material mixtures for use in the foundry,
an apparatus in a foundry for production of an article selected from the group consisting of molds, cores, feeder elements and molding material mixtures,
the use of an apparatus for performance of a process of the invention,
the use of a liquid component comprising dissolved aluminate ions as liquid component of a curable binder system for increasing the moisture resistance of a molding,
the use of a liquid component comprising dissolved aluminate ions for production of an article for use in the foundry industry, selected from the group consisting of molds, cores, feeder elements and molding material mixtures, and the use of a component comprising particulate amorphous silicon dioxide, a first liquid component and a second liquid component for production of a binder.

Particular embodiments, aspects or properties that are described in connection with one of these categories or referred to as preferred are each also correspondingly or analogously applicable to the respective other categories, and vice versa.

Unless stated otherwise, preferred aspects or embodiments of the invention and their various categories can be combined with other aspects or embodiments of the invention and their various categories, especially with other preferred aspects or embodiments. Combinations of respectively preferred aspects or embodiments with one another again result in preferred aspects or embodiments of the invention.

DETAILED DESCRIPTION OF THE INVENTION

In a primary aspect of the present invention, the above problems are addressed and objectives achieved by a process for producing an article for use in the foundry industry, selected from the group consisting of molds, cores, feeder elements and molding material mixtures, comprising the following steps:
(S1) producing a providing a binder system comprising the following components in three spatially separate vessels:
a component (A) comprising particulate amorphous silicon dioxide,
a first liquid component (B) comprising waterglass, and
a second liquid component (C) comprising aluminate ions dissolved in an aqueous phase,
(S2) contacting a mold base material (D) and constituents of all the said components (A), (B) and (C) of the binder system in predetermined ratios in one or more steps, so as to result in a molding material mixture in which the aluminate ions and the particulate amorphous silicon dioxide are mixed wholly or partly into the waterglass,
wherein steps (S1) and (S2) are conducted in a facility for producing molding material mixtures.

The process of the invention comprises the above-defined steps (S1) and (S2), and optionally further steps, and leads to an article for use in the foundry industry, selected from the group consisting of molds, cores, feeder elements and molding material mixtures. It will be apparent here that, especially for production of an article selected from the group consisting of molds, cores and feeder elements, preferably further specific steps are conducted in addition to the above-defined steps (S1) and (S2). Corresponding configurations of the process of the invention with preferred additional steps are described further down.

A first preferred configuration of the process of the invention is thus a process for producing an article for use in the foundry industry, selected from the group consisting of molding material mixtures, comprising the following steps:
(S1) producing or providing a binder system comprising the following components in three spatially separate vessels:
a component (A) comprising particulate amorphous silicon dioxide,
a first liquid component (B) comprising waterglass, and
a second liquid component (C) comprising aluminate ions dissolved in an aqueous phase, (S2) contacting a mold base material (D) and constituents of all the said components (A), (B) and (C) of the binder system in predetermined ratios in one or more steps, so as to result in a molding material mixture in which the aluminate ions and the particulate amorphous silicon dioxide are mixed wholly or partly into the waterglass, wherein steps (S1) and (S2) are conducted in a facility for producing molding material mixtures.

In particular cases, a process for producing an article for use in the foundry industry, selected from the group consisting of molding material mixtures, consists of steps (S1) and (S2).

Document DE 10 2012 020 509 A1 discloses that waterglasses may also contain polyvalent ions, for example boron or aluminum; in this connection, reference is made to document EP 2 305 603 A1.

Document DE 10 2013 106 276 A1, in paragraph [0052], discloses that waterglass-based binders may also contain polyvalent ions, for example boron or aluminum; in this connection, reference is made to document EP 2 305 603 A1. Document EP 2 305 603 A1 discloses a process for producing clear aqueous solutions of silicates that are storage-stable at 20° C. for at least six months (waterglasses).

Document WO 2018/185251 discloses a solution or dispersion comprising waterglass that may additionally also contain one or more polyvalent cations, for example aluminum.

Document EP 2 934 788 B9 discloses a molding material mixture for production of molds and cores for metal processing.

Document U.S. Pat. No. 5,743,953 discloses a hot-curable binder system for the foundry.

Document U.S. Pat. No. 4,432,798 discloses reinforced shaped articles made from aggregate/binder compositions.

Document EP 3 225 327 A1 discloses a powder composition comprising sodium silicate.

Document U.S. Pat. No. 3,203,057 discloses a composition for the production of sand cores for metal casting.

The journal article "GEOPOL®. The Innovated Environment Friendly Inorganic Binder System" by the authors M. Vykoukala, A. Buriana and M. Přerovskáa, Archives of Foundry Engineering, Volume 19, Issue 1/2019, 109-116 (2019), doi: 10.24425/afe.2019.127103, discloses an inorganic binder system (GEOPOL®) based on polysialates.

Document DE 197 38 373 C2 discloses a molding compound. It refers to document EP 0 763 506 A1, which discloses a molding compound consisting of expandable glass granules, into which a waterglass aluminum hydroxide suspension has been mixed as binder.

Document EP 2 921 243 A1 describes a waterglass-containing binder having a proportion of a particulate metal oxide from a list including aluminum oxide.

Document WO2018/185251 discloses a process for producing casting molds, cores, and mold base materials regenerated therefrom.

DE 10 2012 020 510 A1 relates to a molding material mixture for production of casting molds and cores for metal processing, comprising at least: a refractory mold base material, an inorganic binder and particulate amorphous $SiO_2$, producible by the oxidation of metallic silicon by means of an oxygenous gas. The inorganic binder may be at least a water-soluble phosphate glass, a water-soluble borate and/or waterglass, and especially a waterglass having a molar $SiO_2/M_2O$ ratio of 1.6 to 4.0, preferably 2.0 to less than 3.5, with M=lithium, sodium and/or potassium. Rather than waterglass binders, it is also possible to use those based on water-soluble phosphate glasses and/or borates, as described, for example, in U.S. Pat. No. 5,641,015. The preferred phosphate glasses have a solubility in water of at least 200 g/L, preferably at least 800 g/L, and contain between 30 and 80 mol % of $P_2O_5$, between 20 and 70 mol % of $Li_2O$, $Na_2O$ or $K_2O$, between 0 and 30 mol % of CaO, MgO or ZnO, and between 0 and 15 mol % of $Al_2O_3$, $Fe_2O_3$ or $B_2O_3$. The particularly preferred composition is 58% to 72% by weight of $P_2O_5$, 28% to 42% by weight of $Na_2O$ and 0% to 16% by weight of CaO. The phosphate anions are preferably in the form of chains in the phosphate glasses. DE 10 2012 020 510 A1 does not disclose that, when water-soluble phosphate glass and waterglass are used simultaneously, the water-soluble phosphate glass contains aluminate ions.

It has now been found that, surprisingly, the use of aluminate ions as part of the binder system in the process of the invention leads to an improvement in the moisture stability of molds, cores and feeder elements. Likewise surprisingly, casting in these molds and cores, especially casting in these molds and cores with molten aluminum or molten aluminum-containing alloys, also results in a particularly high-quality cast surface of the resultant components or aluminum components.

In addition, it has been found that, surprisingly, the use of aluminate ions in binder systems leads to an improvement in the thermal stability of articles produced therewith; in this respect see the examples further down.

A binder system used in the process of the invention consists of at least the three components mentioned, (A), (B) and (C); in step (S1) of the process of the invention, these three components (A), (B) and (C) of the binder system are in spatially separate vessels.

The term "particulate" refers to a solid powder (including dusts) or a granular material; preferably a pourable and hence also sievable powder or granular material.

The particulate amorphous silicon dioxide used may be either synthetically produced or naturally occurring types. The latter are known, for example, from DE 10 2007 045 649, but they are not preferred since they frequently contain not inconsiderable crystalline components and are therefore classified as carcinogenic.

Typically, and preferably in some cases, the particulate amorphous silicon dioxide comprises particles in the form of dust.

Preferably, the particulate amorphous silicon dioxide comprises particles having a median of the particle size distribution of less than 20 μm, more preferably particles having a median of the particle size distribution of 0.1 μm to 5 μm, most preferably particles having a median of the particle size distribution in the range from 0.1 μm to 1.5 μm, in each case determined by means of laser scattering as described in example 1 below with reference to example 2.

What is meant by "synthetically produced" particulate amorphous silicon dioxide in the context of the present text is that the amorphous silicon dioxide is the target product of a planned chemical reaction process for industrial synthesis of amorphous silicon dioxide
or
a by-product of a planned chemical reaction process for industrial synthesis of a target product that is not amorphous silicon dioxide.

All the amorphous $SiO_2$ species disclosed in the journal article "Mikrosilica—ein Staub macht Karriere" by the authors B. Friede and P. Fidjestøl, Nachr. Chem., 59:956-958 (2011); doi: 10.1002/nadc.201190068, especially in FIG. 4 therein, may be used in the context of the present invention; all these amorphous $SiO_2$ species, just like all $SiO_2$ species specified in the documents cited in the present text, are preferable according to the requirements of the individual case.

Also preferred in many cases are mixtures of the types of particulate amorphous silicon dioxide specified in the references cited.

The term "liquid component" in the context of the present text especially encompasses substances or sub-stance mixtures that are free-flowing and comprise a liquid phase at 20° C. and 1013.25 mbar; as well as liquids, including aqueous solutions (dissolved substances in a liquid solvent), the term also encompasses suspensions of particulate substances in a liquid continuous phase.

Waterglass takes the form of a dissolved constituent of a liquid component in the process of the invention; it may be produced, for example, by dissolving vitreous sodium and potassium silicates in an autoclave or from lithium silicates in a hydrothermal process. Waterglass contains (in mathematical terms) proportions of silicon dioxide and alkali metal oxide, the ratio of which is referred to as the waterglass modulus. According to the invention, it is possible to use waterglass containing one, two or more of the alkali metal ions mentioned and/or containing one or additionally also one or more polyvalent cations, for example ions of aluminum. In many cases, it is preferable when the waterglass is essentially free of lithium ions.

A molding material mixture in the context of the present invention comprises a mold base material as one of multiple constituents. The mold base material is preferably a refractory mold base material. In the present text, in accordance with the customary understanding of the person skilled in the art, "refractory" masses, materials and minerals refer to those that can at least briefly withstand the thermal stress in the course of casting or solidifying of an iron melt, usually cast iron. Suitable mold base materials are natural and synthetic mold base materials, for example quartz sand, zircon sand or chrome ore sand, olivine, vermiculite, bauxite or fireclay.

The "contacting" of a mold base material (D) and constituents of all the said components (A), (B) and (C) of the binder system commences as soon as the mold base material (D) is brought into contact with the first of the other components, and ends when a molding material mixture comprising the constituents or ingredients mentioned is present.

What is meant by the fact that use of "constituents" of all the said components of the binder system is possible in the contacting is that it is not obligatory in each case to use component (A), the first liquid component (B) or the second liquid component (C) in step (S2) as complete components, i.e. as present in the three spatially separate vessels; instead, it is sufficient in each case to use only selected constituents of the components present in the spatially separate vessels in step (S2); this is the case, for example, when processing of the components mentioned takes place between steps (S1) and (S2). According to the requirements of the individual case, the person skilled in the art will decide whether components (A), (B) and/or (C) are used in full, or which of the constituents of the said components of the binder system are used. The person skilled in the art will typically identify suitable mixing ratios from simple experiments. Suitable mixing ratios will also be apparent from the examples and the preferred configurations described hereinafter.

The process of the invention is suitable for the production of moldings customary for metal casting, i.e., for example, for the production of cores, feeder elements and molds (casting molds). The molding material mixture which results from step (S2) is an intermediate from which molds and/or cores and/or feeder elements are produced as end products. It is also particularly advantageously possible to produce moldings having sections with very thin walls. The molds, cores and feeder elements producible as end products (from the molding material mixtures resulting from step (S2)) in the process of the invention have particularly good moisture resistance.

This good moisture resistance of the molds, cores and feeder elements that is achieved when corresponding molding material mixtures are used is also achieved when dispensing entirely with the use of boron compounds (as disclosed, for example, in DE 10 2013 111 626) and lithium compounds (as disclosed, for example, in DE 10 2013 106 276).

The determination of moisture resistance is described by way of example in the examples appended.

However, it is preferable in some cases when lithium compounds and/or boron compounds are also present in the molding material mixture resulting from step (S2). The positive effect of lithium compounds in molding material mixtures on the moisture resistance of molds, cores or feeder elements produced therefrom as described in DE 10 2013 106 276, and the positive effect of boron compounds on the moisture resistance of moldings as described in DE 10 2013 111 626, are amplified in such cases in the process of the invention.

In many cases, however, it is preferable for the reasons mentioned above to dispense entirely with the use of lithium compounds and/or boron compounds; in this way too, it is possible by the process of the invention to achieve an advantageously high moisture resistance of the molds, cores and feeder elements producible by the process of the invention without resulting in the known disadvantages that result from use of lithium compounds and/or boron compounds.

In the field of the foundry industry, it is common knowledge that process parameters in the production of a molding (mold and/or core and/or feeder element) have a significant influence on the moisture stability of the moldings produced. For example, an increase in the core box temperature regularly leads to higher moisture stabilities of the moldings produced; the person skilled in the art will take this into account in the choice of process parameters.

A process of the invention is conducted with the aforementioned advantages where the person skilled in the art would use the waterglass-based binder systems known from the prior art. Suitable fields of use relate both to applications for aluminum casting and for iron, steel or brass casting.

The molding material mixtures that result as an intermediate in the process of the invention are also used for production of waterglass-bound feeders.

The process of the invention affords molds and cores having a particularly positive combination of properties for many applications, of comparatively high moisture resistance (moisture stability) and comparatively high relative molding weight (mass based on the volume of a given body; this is referred to as core weight in the case of cores).

What is more particularly achieved is a combination which is particularly preferred in the field of the foundry industry, of moisture resistance, core weight and flexural strength of the molds and cores producible as end products (from the molding material mixtures that result from step (S2)) in the process of the invention.

The invention especially and preferably relates to a process (as described above, preferably as identified above as preferred) wherein the contacting of mold base material (D)

and constituents of all the said components (A), (B) and (C) of the binder system in predetermined ratios in step (S2) is conducted in one or more steps, by using an amount of the first liquid component (B) present as a constituent of the binder system in step (S1)
and/or
an amount of the second liquid component (C) present as a constituent of the binder system in step (S1)
and/or
selected constituents of the first liquid component (B) after separation, preferably filtration, of the first liquid component (B) present as a constituent of the binder system
and/or
selected constituents of the second liquid component (C) after separation, preferably filtration, of the second liquid component (C) present as a constituent of the binder system in the contacting in step (S2).

An amount of a component ((A), (B), or (C)) in the context of the present text is understood to mean a quantifiable amount (i.e. in relation to mass or volume) of the respective component (in its respective vessel) in which the molar ratios of all chemical constituents relative to one another correspond to the molar ratios of these constituents to one another in the overall component. Typically, an amount of a component or liquid component is used when no separation process, i.e., in particular, no filtration either, is conducted between the producing or providing of the binder system in step (S1) and the contacting of the component or liquid component with a mold base material in step (S2).

What is meant by the fact that, in the contacting in step (S2), an amount of the first liquid component (B) present as a constituent of the binder system in step (S1) or
an amount of the second liquid component (C) present as a constituent of the binder system in step (S1)
is used is that, in step (S2), it is not the case that constituents of the first liquid component (B) or of the second liquid component (C) are used generally, but rather specifically amounts of the first liquid component (B) or amounts of the second liquid component (C) in each case as exist in or as result from step (S1), in each case in a separate vessel (spatially separate from the other vessels) as part of the binder system.

Preferably, both components (the first liquid component (B) and the second liquid component (C)) are used in step (S2) as exist in or result from step (S1) as part of the binder system; in this way, it is possible to conduct the process in the foundry in a particularly efficient, resource-conserving and particularly environmentally compatible manner.

In some cases, however, it is preferable to use only selected constituents of the first liquid component (B) and/or of the second liquid component (C) in the contacting in step (S2). This can be achieved, for example, by subjecting the respective liquid component as exists as a constituent of the binder system in step (S1) to a separation process, and not using all the products of the separation process in step (S2). The separation process is preferably a filtration, in which case particular preference is given in turn to using the filtrate in the contacting in step (S2); according to the requirements of the individual case, however, the person skilled in the art will also consider other separation processes to be preferable.

In many cases, especially when mold and/or core are built up layer by layer, an especially preferably good combination of preferably good moisture resistance of the molds and cores producible by the process of the invention and a particularly advantageous surface quality of the metal castings obtained when these molds and cores are used for casting is achieved.

In many cases, it is preferable in step (S2) to use an amount of the first liquid component (B) present in step (S1) as a constituent of the binder system or an amount of the second liquid component (C) present in step (S1) as a constituent of the binder system, and to use only selected constituents of the respective other component (but not the complete component as exists in step (S1) as a constituent of the binder system).

What is meant by the fact that the said components of the binder system are used in predetermined ratios in the contacting in step (S2) is that predefined masses or volumes or molar amounts of the individual components or of the constituents are used in each case (for example according to a formulation).

What is meant more particularly by the fact that the mold base material is contacted with the said components of the binder system in one or more steps in step (S2) is that the mold base material (D) is contacted either simultaneously or non-simultaneously with constituents or amounts of components (A), (B) and (C), where the constituents or amounts of components (A), (B) and (C) are contacted spatially separately or not spatially separately with the mold base material (D) in a sequence depending on the requirements of the individual case, for example individually, collectively, or collectively in premixed form.

In many cases, preferably in conjunction with layered buildup of moldings, it is preferable when the mold base material is first contacted with component (A) and only thereafter, simultaneously or successively, with constituents or amounts of liquid components (B) and (C).

In a particularly preferred configuration of the process of the invention, preferably in conjunction with layered buildup of moldings (molds and/or cores and/or feeder elements), the mold base material is first contacted with component (A); amounts of liquid components (B) and (C) are mixed; the resulting mixture is filtered; the mixture of constituents of liquid components (B) and (C) that results as the filtrate is contacted with the mold base material already contacted with component (A).

In a particularly preferred configuration of the process of the invention, preferably in conjunction with layered buildup of moldings, the mold base material is first contacted with component (A); amounts of liquid components (B) and (C) are each filtered separately from one another, so as to result in constituents of liquid components (B) and (C) in each case as filtrate; in a further step, the filtrates of liquid components (B) and (C) are combined, and the resulting mixture is contacted in a further step with the mold base material that has already been contacted with component (A).

In a particularly preferred configuration of the process of the invention, preferably in conjunction with layered buildup of moldings, the mold base material is first contacted with component (A); amounts of liquid components (B) and (C) are each filtered separately from one another, so as to result in each case in constituents of liquid components (B) and (C) as filtrate; in a further step, the respective filtrates of liquid components (B) and (C) are contacted spatially separately and/or separately in time with the mold base material that has already been contacted with component (A).

In a particularly preferred configuration of the process of the invention, preferably in conjunction with layered buildup of moldings, the mold base material is first contacted in any sequence with component (A) and liquid component (C); an amount of liquid component (B) is filtered, so as to result in constituents of liquid component (B) as filtrate; these constituents from liquid component (B) are contacted in a further step with the mold base material that has already been contacted with component (A) and liquid component (C).

Preference is given to a process of the invention (as described above, preferably as identified above as preferred) wherein constituents or amounts of the first liquid component (B) and second liquid component (C) each present as a constituent of the binder system in step (S1), in step (S2), are first mixed in a predetermined ratio, so as to result in
   a mixture comprising waterglass and aluminate ions in predetermined proportions, and then the mold base material is contacted with this mixture, preferably by
   (a) allowing a period of not more than 24 hours, preferably a period of not more than 12 hours, more preferably 4 hours, most preferably not more than 1 hour, between the mixing of the amounts or constituents of said liquid components and the contacting of the mold base material with the resulting mixture
   and/or
   (b) contacting, preferably mixing, the mold base material with the resulting mixture of the amounts or constituents of the first liquid component (B) and the second liquid component (C) before solids are formed in the resulting mixture,
or
not mixing before the mold base material (D) is contacted
   (i) fully simultaneously, (ii) partly simultaneously or (iii) in any sequence successively with constituents or amounts of the first liquid component (B) and the second liquid component (C).

The mixture resulting from the mixing in a predetermined ratio of
   amounts of the first liquid component (B) and second liquid component (C) each present as a constituent of the binder system in step (S1)
   or
   constituents or amounts of the first liquid component (B) and second liquid component (C) used in step (S2),
comprising waterglass and aluminate ions, is preferably not storage-stable at 20° C. for at least 6 months, more preferably not storage-stable at 20° C. for at least 2 months, and should therefore be consumed quickly after production thereof.

What is meant by the fact that the mixtures are not storage-stable at 20° C. for the specified periods of time is that they do not remain clear up to the end of the period specified, and that there can be gelation or precipitates before the end of the period specified.

When used in the process of the invention within the periods of time specified, the above-detailed positive effects of the process of the invention and of the process products of the invention are achieved without any problem associated with the low storage stability of the said mixture. The contacting in step (S2) is brought about before instability or the precipitation of unacceptable amounts of solids makes the mixture unsuitable for use in the process of the invention.

The person skilled in the art is aware of methods of detecting the formation of solids in a solution; they will examine, for example, light scattering in the mixture or detect the turbidity of the mixture. If solids precipitate to an exceptional degree, this is apparent, for example, even to the naked eye by the (altered) turbidity or by the formation of a sediment; in the case of gel formation, in addition, a distinct change in viscosity is apparent, or measurable. Corresponding test methods are known to the person skilled in the art.

In many cases, it is preferable when constituents or amounts of liquid components (B) and (C) are not mixed with one another before they are contacted with the mold base material (D); in these cases, it is thus ruled out that constituents or amounts of liquid components (B) and (C) are first mixed with one another and only then is the resulting mixture contacted with the mold base material (D).

What is meant by "fully simultaneously" is that the periods of contacting for (B) and (C) are identical, meaning that they have the same start and the same end. What is meant by "partly simultaneously" is that the periods of contacting for (B) and (C) overlap. For example, dosing devices (for example one each for liquid components (B) and (C)) can (i) open simultaneously and close simultaneously (i.e. contacting is effected fully simultaneously). It is possible (ii) that the first dosing device is opened first and the second is opened thereafter, but before the first is closed (i.e. contacting is effected partly simultaneously). Finally, it is possible that (iii) first one dosing device is opened and closed, and the second only thereafter (i.e. successive contacting is effected in any sequence).

The performing of the process in the manner described here leads, to an exceptional degree, to a high moisture resistance of the molds, cores and feeder elements producible in the process of the invention, and at the same time to a particularly high surface quality of the metal pieces obtained in casting with these molds and cores (especially in casting with aluminum or in casting with aluminum-containing alloys).

Preference is given to a process of the invention (as described above, preferably as identified above as preferred) wherein, in step (S2), constituents or amounts of the first liquid component (B) are added at an individually predetermined dosing rate and/or constituents or amounts of the second liquid component (C) at an individually predetermined dosing rate
   (i) to the mold base material (D)
   and/or
   (ii) to constituents or amounts of another component of the binder system,
   preferably in an automated manner and/or by means of one or more dosing devices.

In many cases, it is preferable to add constituents or amounts of liquid components (B) and (C) at an individually predetermined dosing rate to the mold base material (D).

Metered addition at an individually predetermined dosing rate enables a particularly resource-conserving process. It is preferable in many cases that metered addition at an individually determined dosing rate is automated only for selected constituents or amounts among those metered in. In some cases, however, it is preferable that metered addition at an individually determined dosing rate is automated for all the constituents or amounts metered in. Preference is given to automated metered addition at an individually predetermined dosing rate by means of one or more dosing devices.

The advantages and effects mentioned above in connection with the process of the invention are manifested in a particularly reproducible manner here.

Preference is given to a process of the invention (as described above, preferably as identified above as preferred) wherein the plant for producing molding material mixtures comprises:

one or more dosing devices for metered addition of constituents or amounts of the first liquid component (B) and/or of constituents or amounts of the second liquid component (C) and/or of constituents or amounts of component (A) comprising particulate amorphous silicon dioxide and/or the mold base material (D) and an open-loop or closed-loop control device for the one dosing device for the multiple dosing devices, preferably a microprocessor-assisted open-loop or closed-loop control device.

In a preferred embodiment, the plant for producing molding material mixtures comprises at least four dosing devices; one each for constituents or amounts of the first liquid component (B) and for constituents or amounts of the second liquid component (C) and for constituents or amounts of component (A) and for the mold base material (D).

In an embodiment which is preferred in some cases, the plant for producing molding material mixtures comprises a common dosing device for constituents or amounts of the first liquid component (B) and of constituents or amounts of the second liquid component (C).

In an embodiment which is preferred in some cases, the plant for producing molding material mixtures comprises two dosing devices; one common dosing device each for (i) constituents or amounts of the first liquid component (B) and constituents or amounts of the second liquid component (C) and for (ii) constituents or amounts of component (A) and the mold base material (D).

In each case, this/these dosing device(s) is/are preferably controlled by an open-loop or closed-loop control device; more preferably, this/these dosing device(s) is/are controlled by a microprocessor-assisted open-loop or closed-loop control device; it is very particularly preferable here when a common open-loop or closed-loop control device controls the metered addition by means of individually predetermined dosing rates for constituents or amounts of the first liquid component (B) and for constituents or amounts of the second liquid component (C) and for constituents or amounts of component (A) and of the mold base material (D).

Preference is given to a process of the invention (as described above, preferably as identified above as preferred) wherein the total mass of the constituents or amounts of the first liquid component (B) used in the contacting in step (S2) and of the constituents or amounts of the second liquid component (C) used comprises:

15% to 35% by weight, preferably 18% to 30% by weight, more preferably 20% of the percent by weight, most preferably 22-27% by weight, of silicon dioxide, 8% to 17% by weight of alkali metal oxides, preferably 10% to 17% by weight, more preferably 10% to 16% by weight, aluminate ions, calculated as $Al_2O_3$, in an amount up to 4.0% by weight, preferably 0.4% to 4.0% by weight, more preferably 0.45% to 3.5% by weight, even more preferably 0.75% to 3.0% by weight, preferably 1% 2.5% by weight, particularly preferably 1.25% to 2% by weight, where the percentages by weight are based on the total mass of the constituents or amounts of the first liquid component (B) and of the constituents or amounts of the second liquid component (C) used in the contacting in step (S2).

Na, Li and K are detected, for example, via inductively coupled plasma optical emission spectrometry (ICP-OES).

With the specified contents of silicon dioxide and alkali metal oxide, the above-discussed effects and advantages are achieved to a particularly good degree.

In the preferred concentration ranges, a moisture resistance of molds, cores and feeder elements which is particularly preferred in the field of the foundry industry is regularly achieved; what is more particularly achieved is a combination which is particularly preferred in the field of the foundry industry, of moisture resistance, core weight and flexural strength of the molds and cores producible as end products (from the molding material mixtures that result from step (S2)) in the process of the invention.

Preference is given to a process of the invention (as described above, preferably as identified above as preferred) wherein, in the total mass of the constituents or amounts of the first liquid component (B) used in step (S2) and of constituents or amounts of the second liquid component (C) used, the mass ratio (determined analogously to the procedure in the calculation of the waterglass modulus) of alkali metal oxide to $Al_2O_3$ is in the range from 35:1 to 3:1, preferably in the range from 20:1 to 5:1, more preferably in the range from 15:1 to 7:1.

With the specified ratios of alkali metal oxide to $Al_2O_3$, the above-described effects and advantages are achieved to an exceptional degree; in particular, the binder system with these mass ratios has particularly advantageous properties with regard to processing thereof in the foundry industry.

Preference is given to a process of the invention (as described above, preferably as identified above as preferred) wherein, in step (S2), the temperature of the constituents or amounts of the first liquid component (B) used and of the constituents or amounts of the second liquid component (C) used at the start of the contacting or mixing are each within a range from 5 to 35° C.

This is especially true in the layered buildup of molds, cores and feeder elements.

Preferably, the constituents or amounts of the first liquid component (B) used and the constituents or amounts of the second liquid component (C) used at the start of the contacting or mixing are each at the ambient temperature in the foundry.

Preference is given to a process of the invention (as described above, preferably as identified above as preferred) wherein, in the total mass of the constituents or amounts of the first liquid component (B) used in step (S2) and of constituents or amounts of the second liquid component (C), the mass ratio (determined analogously to the procedure in the determination of the waterglass modulus) of $Al_2O_3$ to $SiO_2$ is greater than 1:70, preferably greater than 1:69, more preferably greater than 1:64.

In many cases, it is preferable in the context of the present invention when a mixture of the constituents or amounts of the first liquid component (B) and constituents or amounts of the second liquid component (C) used in step (S2) is not a clear solution.

Preference is given to a process of the invention (as described above, preferably as identified above as preferred) wherein, in step (S2), constituents or amounts of component (A) comprising particulate amorphous silicon dioxide are contacted with the mold base material and with constituents or amounts of the first liquid component (B) and constituents or amounts of the second liquid component (C), wherein
component (A) used as a constituent of the binder system in step (S1)
(i) is particulate, preferably a powder or granular material, or (ii) is a suspension of particulate amorphous silicon dioxide and/or the constituents or amounts of component (A) used in step (S2), comprising particulate amorphous silicon dioxide, are used (i) in the form of a powder or granular material, preferably in the form of a powder, or (ii) of a suspension and/or (preferably "and")

the particulate amorphous silicon dioxide of component (A) is used as a constituent in step (S2) and is preferably selected from the group consisting of:
  particulate synthetic amorphous silicon dioxide containing silicon dioxide in a proportion of at least 80% by weight, based on the total mass of the particulate synthetic amorphous silicon dioxide, and at least carbon as secondary constituent, preferably producible by reducing quartz in an arc furnace;
  particulate synthetic amorphous silicon dioxide comprising oxidic zirconium as secondary constituent and preferably producible by thermal breakdown of $ZrSiO_4$;
  particulate synthetic amorphous silicon dioxide producible by oxidizing metallic silicon by means of an oxygenous gas;
  particulate synthetic amorphous silicon dioxide producible by quenching a silicon dioxide melt fumed silica, preferably producible by pyrolysis of silicon tetrachloride;
  and
  mixtures thereof and/or component (A) comprising particulate amorphous silicon dioxide additionally comprises one, two, three or more further constituents that are used as well in step (S2) and are independently selected from the group consisting of:
  particulate materials, preferably particulate inorganic materials, preferably selected from the group consisting of oxides of aluminum, preferably aluminum oxide in the alpha phase, bauxite, oxides of zirconium, preferably zirconium (IV) oxide, mixed aluminum/silicon oxides, zinc oxide, barium sulfate, phosphorus compounds, preferably tricalcium phosphate, sheet silicates, graphite, carbon black, glass beads, oxides of magnesium, borosilicates, ceramic hol-low beads, oxidic boron compounds, preferably powdery oxidic boron compounds, and mixtures thereof
  water-soluble materials,
  alkali metal hydroxides,
  surfactants,
  film formers,
  hydrophobizing agents, preferably organosilicon compounds, silanes, silicones and siloxanes, waxes, paraffins, metal soaps,
  and
  carbohydrates.

Preferably, the constituents or amounts of component (A) used in step (S2), comprising particulate amorphous silicon dioxide, are used (i) in the form of a powder or granular material, preferably in the form of a powder, or (ii) as a suspension.

In some cases, it is preferable that neither one of the components of the binder system nor the molding material mixture comprises particulate amorphous silicon dioxide produced by thermal decomposition of $ZrSiO_4$ to give $ZrO_2$ from $ZrSiO_4$.

Preference is given to a process of the invention (as described above, preferably as identified above as preferred) wherein the proportion of silicon dioxide in component (A) comprising particulate amorphous silicon dioxide, preferably the proportion of particulate amorphous silicon dioxide in component (A) comprising particulate amorphous silicon dioxide, is at least 25% by weight, preferably at least 30% by weight, more preferably at least 40% by weight, most preferably at least 50% by weight, based in each case on the total mass of component (A) comprising particulate amorphous silicon dioxide.

According to the origin or preparation process, natural and/or synthetic amorphous silicon dioxide contains up to 50% by weight of secondary constituents, i.e. crystalline silicon dioxide and/or non-silicon dioxide substances. The expression "particulate amorphous silicon dioxide" therefore always also includes secondary constituents present in the particulate amorphous silicon dioxide. In particular, with these proportions of particulate amorphous silicon dioxide, a combination which is advantageous for many cases of preferably high moisture stability and preferably high molding weight (core weight in the case of cores) is achievable.

Preference is given to a process of the invention (as described above, preferably as identified above as preferred) wherein the first liquid component (B) and/or second liquid component (C) present as a constituent of the binder system in step (S1) is/are used in step (S2) out of the respective vessel without further processing.

What is meant by the fact that the first liquid component (B) and/or second liquid component (C) present as a constituent of the binder system in step (S1) is/are used in step (S2) out of the respective vessel without further processing is that there is no separation process, more particularly no filtration either, between the withdrawal of amounts of the respective liquid component from the vessel and the use thereof in step (S2).

In many cases, for reasons of process economy and from an environmental point of view, it is desirable that there is no further processing of any of the liquid components (B) and (C) between the withdrawal of liquid components (B) and (C) from the respective vessel and before use in step (S2); thus, amounts (and not just specific constituents) of the components are used in step (S2).

Preference is given to a process of the invention (as described above, preferably as identified above as preferred)
  wherein the first liquid component (B), preferably the constituents or amounts of the first liquid component (B) used in step (S2), preferably in the aqueous phase, comprises one or more alkali metals M from the group consisting of lithium, sodium and potassium, where the proportion of potassium ions, calculated as $K_2O$, is preferably greater than 0.1% by weight, more preferably greater than 0.2% by weight, especially preferably greater than 0.5% by weight, most preferably greater than 1% by weight,
  and/or
  wherein the second liquid component (C), preferably the constituents or amounts of the first liquid component (C) used in step (S2), comprises one or more alkali metals M from the group consisting of lithium, sodium and potassium, where the proportion of potassium ions, calculated as $K_2O$, is preferably greater than 0.1% by weight, more preferably greater than 0.2% by weight, especially preferably greater than 0.5% by weight, most preferably greater than 1% by weight, and/or wherein the total mass of the first liquid component (B) and of the second liquid component (C), preferably the total mass of the constituents or amounts of the first liquid component (B) and of the second liquid component (C) used in step (S2), comprises one or more alkali metals M from the group consisting of lithium, sodium and potassium, where the proportion of potassium ions, calculated as $K_2O$, is preferably greater than 0.1% by weight, more preferably greater than 0.2% by weight, especially preferably greater than 0.5% by weight, most preferably greater than 1% by weight, and/or wherein the first liquid component (B), preferably the constituents or amounts of the first liquid component (B) used in step (S2), preferably in the aqueous phase, comprises a content of alkali metal silicate in the range from 20% by weight to 60% by weight, preferably in the range from 25% by weight to 50% by weight, based on the total mass of the first liquid component (B);

and/or wherein the first liquid component (B), preferably the constituents or amounts of the first liquid component (B) used in step (S2), preferably in the aqueous phase, comprises waterglass with a molar $SiO_2$/alkali metal oxide modulus in the range from 1.6 to 4.0.

All the resultant combinations are preferred; the person skilled in the art will choose a suitable combination in each case according to the requirements of the individual case.

Preference is given to a process of the invention (as described above, preferably as identified above as preferred) wherein the first liquid component (B) and/or the second liquid component (C) additionally comprise(s) one, two or more further constituents that are used as well in step (S2) and are independently selected from the group consisting of:

surface-active substances, especially surfactants, defoamers and wetting agents, alkali metal phosphates, oxidic boron compounds, preferably selected from the group consisting of borates, boric acids and boric anhydrides.

Preferably, the first liquid component (B), as well as water and waterglass dissolved and/or dispersed therein, also contains one or more surface-active substances, preferably from the group of the surfactants, defoamers and wetting agents.

More preferably, the first liquid component (B), as well as water and waterglass dissolved and/or dispersed therein, also contains one or more surfactants.

Preferably, the second liquid component (C), as well as water and aluminate ions dissolved therein, also contains one or more surface-active substances, preferably from the group of the surfactants, defoamers and wetting agents.

More preferably, the second liquid component (C), as well as water and aluminate ions dissolved therein, also contains one or more surfactants.

For the reasons given above, although it is preferable in many cases when neither of the two liquid components (B) and (C) contains boron compounds, it is preferable in some cases when the first liquid component (B) and/or the second liquid component (C) additionally comprises one or more of the boron compounds mentioned. It is preferable here when one or more of the boron compounds mentioned is/are present in each case either in the first liquid component (B) or in the second liquid component (C), and the respective other component is essentially free of boron compounds.

Preference is given to a process of the invention (as described above, preferably as identified above as preferred) wherein the second liquid component (C) comprises dissolved alkali metal aluminates that are used in step (S2).

In many cases, it is preferable on account of good availability to use alkali metal aluminates in the process of the invention.

Preference is given to a process of the invention (as described above, preferably as identified above as preferred) wherein the first liquid component (B), preferably the constituents or amounts of the first liquid component (B) used in step (S2), comprise(s)

a content of aluminate ions, calculated as $Al_2O_3$, of not greater than 0.4% by weight, preferably 0.1% by weight, and/or a content of lithium ions, calculated as $LiO_2$, of not greater than 0.1% by weight, preferably not greater than 0.01% by weight, and/or a content of boron ions, calculated as $B_2O_3$, of not greater than 0.1% by weight, preferably not greater than 0.01% by weight, based in each case on the total mass of the first liquid component (B), and/or wherein the second liquid component (C), preferably the constituents or amounts of the first liquid component (C) used in step (S2), comprise(s)

in the aqueous phase, a content of aluminate ions, calculated as $Al_2O_3$, in the range from 0.4% by weight to 35% by weight, preferably in the range from 1% by weight to 30% by weight, more preferably in the range from 2.5% by weight to 25% by weight, most preferably 5% by weight to 23% by weight, and/or a content of lithium ions, calculated as $LiO_2$, of not greater than 0.1% by weight, preferably not greater than 0.01% by weight, and/or a content of boron ions, calculated as $B_2O_3$, of not greater than 0.1% by weight, preferably not greater than 0.01% by weight, based in each case on the total mass of the second liquid component (C), and/or wherein the total mass of the constituents or amounts of the first liquid component (B) and constituents or amounts of the second liquid component (C) used in the contacting in step (S2) comprises a content of aluminate ions, calculated as, $Al_2O_3$, in the range from 0.4% to 4.0% by weight, preferably 0.45% to 3.5% by weight, more preferably 0.75% to 3.0% by weight, even more preferably 1% to 2.5% by weight, preferably 1.25% to 2% by weight, and/or a content of lithium ions, calculated as $LiO_2$, of not greater than 0.1% by weight, preferably not greater than 0.01% by weight, and/or a content of boron ions, calculated as $B_2O_3$, of not greater than 0.1% by weight, preferably not greater than 0.01% by weight, where the percentages are based on the total mass of the constituents or amounts of the first liquid component (B) and of the constituents or amounts of the second liquid component (C) used in the contacting in step (S2).

When the total mass of the constituents or amounts of the first liquid component (B) used in the contacting in step (S2), and constituents or amounts of the second liquid component (C), comprises a content of aluminate ions, calculated as $Al_2O_3$, in the range from 0.4% to 4.0% by weight, preferably 0.45% to 3.5% by weight, more preferably 0.75% to 3.0% by weight, even more preferably 1% to 2.5% by weight, preferably 1.25% to 2% by weight, a resulting mixture of liquid components (B) and (C) is not storage-stable at 20° C. for at least 6 months; but this is unproblematic because the contacting in step (S2) is brought about before instability or the precipitation of unacceptable amounts of solids makes the mixture unsuitable for use in the process of the invention.

Preferably, in a process of the invention, even after contacting of constituents or amounts of components (B) and (C), the aqueous solution of silicates is not one that is storage-stable at 20° C. for at least 6 months, more preferably at 20° C. for at least 2 months.

Preference is additionally given to a process of the invention wherein the first liquid component (B), preferably the constituents or amounts of the first liquid component (B) used in step (S2), comprise(s)
 a content of aluminate ions, calculated as $Al_2O_3$, of not greater than 0.4% by weight, preferably 0.1% by weight,
 and
 a content of lithium ions, calculated as $LiO_2$, of not greater than 0.1% by weight, preferably not greater than 0.01% by weight,
 and
 a content of boron ions, calculated as $B_2O_3$, of not greater than 0.1% by weight, preferably not greater than 0.01% by weight,
 based in each case on the total mass of the first liquid component (B).

Preference is additionally given to a process of the invention wherein the second liquid component (C), preferably the constituents or amounts of the first liquid component (C) used in step (S2), comprise(s)
 in the aqueous phase, a content of aluminate ions, calculated as $Al_2O_3$, in the range from 0.4% by weight to 35% by weight, preferably in the range from 1% by weight to 30% by weight, more preferably in the range from 2.5% by weight to 25% by weight, most preferably 5% by weight to 23% by weight,
 and
 a content of lithium ions, calculated as $LiO_2$, of not greater than 0.1% by weight, preferably not greater than 0.01% by weight,
 and
 a content of boron ions, calculated as $B_2O_3$, of not greater than 0.1% by weight, preferably not greater than 0.01% by weight,
 based in each case on the total mass of the second liquid component (C).

Particular preference is given to a process of the invention wherein the total mass of the constituents or amounts of the first liquid component (B) and constituents or amounts of the second liquid component (C) used in the contacting in step (S2) comprises a content of aluminate ions, calculated as, $Al_2O_3$, in the range from 0.4% to 4.0% by weight, preferably 0.45% to 3.5% by weight, more preferably 0.75% to 3.0% by weight, even more preferably 1% to 2.5% by weight, preferably 1.25% to 2% by weight, and
 a content of lithium ions, calculated as $LiO_2$, of not greater than 0.1% by weight, preferably not greater than 0.01% by weight,
 and
 a content of boron ions, calculated as $B_2O_3$, of not greater than 0.1% by weight, preferably not greater than 0.01% by weight,
 where the percentages are based on the total mass of the constituents or amounts of the first liquid component (B) and of the constituents or amounts of the second liquid component (C) used in the contacting in step (S2).

In many cases, on account of the known disadvantages of lithium- and boron-containing compounds in the field of the foundry industry, however, it is also preferable to dispense entirely with the use of lithium- and/or boron-containing compounds, such that both the first liquid component (B), especially the constituents or amounts of the first liquid component (B) used in step (S2), and the second liquid component (C), especially the constituents or amounts of the first liquid component (C) used in step (S2), are essentially free of lithium- and boron-containing compounds; even without these compounds, it is possible by the process of the invention to achieve an advantageously high moisture resistance of the molds, cores and feeder elements producible by the process of the invention.

Preference is given to a process of the invention (as described above, preferably as identified above as preferred)
 wherein the second liquid component (C) comprises
  a content of lithium ions, calculated as $LiO_2$, of not greater than 0.1% by weight, preferably not greater than 0.01% by weight,
  and/or
  a content of boron ions, calculated as $B_2O_3$, of not greater than 0.1% by weight, preferably not greater than 0.01% by weight,
  based in each case on the total mass of the second liquid component (C), and/or
 wherein component (A) comprising particulate amorphous silicon dioxide
  comprises a content of aluminate ions of not greater than 0.1% by weight, preferably not greater than 0.01% by weight, more preferably a content of alkali metal aluminates not greater than 0.1% by weight, most preferably not greater than 0.01% by weight, based on the total mass of component (A),
 and/or
 wherein, in the molding material mixture that results from step (S2), the molar $[Li_2O]/[M_2O]$ ratio is less than 0.030, preferably less than 0.025, more preferably less than 0.010,
  where $[M_2O]$ is the molar amount in moles of alkali metal M, calculated as $M_2O$, ultimately including only the following compounds in the calculation: amorphous alkali metal silicates, alkali metal oxides and alkali metal hydroxides, including the hydrates thereof, where Li as part of M is included without an activity factor,
  and where $[Li_2O]$ is the molar amount in moles of Li, calculated as $Li_2O$, ultimately including only the following compounds in the calculation: amorphous lithium silicates, lithium oxides and lithium hydroxide, including the hydrates thereof.

The expression "activity factor" has the meaning described in document DE 10 2013 106 276 A1 in paragraphs [0037] to [0038].

Particular preference is given to a process of the invention (as described above, preferably as identified above as preferred)
wherein the second liquid component (C) comprises
a content of lithium ions, calculated as $LiO_2$, of not greater than 0.1% by weight, preferably not greater than 0.01% by weight,
and
a content of boron ions, calculated as $B_2O_3$, of not greater than 0.1% by weight, preferably not greater than 0.01% by weight,
based in each case on the total mass of the second liquid component (C), and
wherein component (A) comprising particulate amorphous silicon dioxide
comprises a content of aluminate ions of not greater than 0.1% by weight, preferably not greater than 0.01% by weight, more preferably a content of alkali metal aluminates not greater than 0.1% by weight, most preferably not greater than 0.01% by weight, based on the total mass of component (A),
and
wherein, in the molding material mixture that results from step (S2), the molar $[Li_2O]/[M_2O]$ ratio is less than 0.030, preferably less than 0.025, more preferably less than 0.010,
where $[M_2O]$ is the molar amount in moles of alkali metal M, calculated as $M_2O$, ultimately including only the following compounds in the calculation: amorphous alkali metal silicates, alkali metal oxides and alkali metal hydroxide, including the hydrates thereof, where Li as part of M is included without an activity factor,
and where $[Li_2O]$ is the molar amount in moles of Li, calculated as $Li_2O$, ultimately including only the following compounds in the calculation: amorphous lithium silicates, lithium oxides and lithium hydroxide, including the hydrates thereof.

The process of the invention can be performed in a particularly environmentally responsible and resource-conserving manner in this way.

Preference is given to a process of the invention (as described above, preferably as identified above as preferred) wherein the article is produced in step (S2) using respective total masses of the mold base material (D) and of the respective constituents or amounts of component (A) comprising particulate amorphous silicon dioxide, of the first liquid component (B) and of the second liquid component (C), where:
0.1 to 3.0 parts by weight of component (A) comprising particulate amorphous silicon dioxide is used, preferably 0.3 to 2.0 parts by weight, based on 100 parts by weight of the total mass of the refractory mold base material (D) used,
and/or (preferably "and")
constituents or amounts of the first liquid component (B) and constituents or amounts of the second liquid component (C) in the range from 0.5 to 20 parts by weight in total, preferably in the range from 0.5 to 7 parts by weight in total, more preferably in the range from 0.5 to 4 parts by weight in total, most preferably in the range from 0.7 to 3 parts by weight in total, based on 100 parts by weight of the amount of the refractory mold base material (D) used,
and/or (preferably "and")
the ratio of
the total mass of the constituents or amounts of the first liquid component (B) used to
the total mass of the constituents or components of the second liquid component (C) used is in the range from 86:1 to 1:1, preferably in the range from 20:1 to 2:1, more preferably in the range from 10:1 to 3:1.

Preference is given to a process of the invention (as described above, preferably as identified above as preferred) wherein the mold base material (D) consists at least partly of recycled mold base material, preferably consists to an extent of at least 50% by weight of recycled mold base material, more preferably to an extent of at least 70% by weight, most preferably to an extent of at least 85% by weight.

The process of the invention can be performed in a particularly environmentally responsible and resource-conserving manner in this way with achievement of the above-described effects and advantages.

In many cases, it is preferable when the molds, cores and feeder elements that result as end products in the process of the invention are produced by layered buildup, preferably by layered buildup by means of 3D printing. Corresponding methods are known in the prior art, for example from DE 10 2014 118 577 A1 and DE 10 2011 105 688 A1.

Preference is given to a process of the invention (as described above, preferably as identified above as preferred) comprising the steps of
(S3) three-dimensionally shaping the molding material mixture, preferably by means of a shaping mold, or by stepwise buildup by means of a 3D printer,
(S4) curing the binder, so as to result in a mold, a core or a feeder element.

A second preferred configuration of the process of the invention is thus a process for producing an article for use in the foundry industry, selected from the group consisting of molds, cores and feeder elements, comprising the following steps:
(S1) producing a providing a binder system comprising the following components in three spatially separate vessels:
a component (A) comprising particulate amorphous silicon dioxide,
a first liquid component (B) comprising waterglass, and
a second liquid component (C) comprising aluminate ions dissolved in an aqueous phase,
(S2) contacting a mold base material (D) and constituents of all the said components (A), (B) and (C) of the binder system in predetermined ratios in one or more steps, so as to result in a molding material mixture in which the aluminate ions and the particulate amorphous silicon dioxide are mixed wholly or partly into the waterglass,
wherein steps (S1) and (S2) are conducted in a facility for producing molding material mixtures,
(S3) three-dimensionally shaping the molding material mixture,
preferably by means of a shaping mold, or by stepwise buildup by means of a 3D printer,
(S4) curing the binder, so as to result in a mold, a core or a feeder element.

In particular cases, a process for producing an article for use in the foundry industry, selected from the group consisting of molds, cores and feeder elements, consists of steps (S1), (S2), (S3) and (S4).

Preference is given to a process of the invention (as described above, preferably as identified above as preferred) for layered buildup of molds and/or cores and/or feeder elements, preferably for layered buildup of molds and/or cores and/or feeder elements by 3D printing, wherein the contacting of a mold base material (D) and constituents of all of the said components (A), (B) and (C) of the binder system in one or more steps in step (S2) is effected by performing at least the following steps:

(S2-1-1) commixing constituents or amounts of the first liquid component (B) and of the second liquid component (C), so as to result in a mixture of constituents or amounts of the first liquid component (B) and second liquid component (C);

(S2-1-2) filtering the mixture of constituents or amounts of the first liquid component (B) and of the second liquid component (C) that results from step (S2-1-1), so as to result in a filtered mixture of constituents of the first liquid component (B) and second liquid component (C);

(S2-1-3) contacting the filtered mixture of constituents of the first liquid component (B) and the second liquid component (C) with mold base material (D) and with component (A) of the binder system that has been precontacted with the mold base material (D).

Preference is given to a process of the invention (as described above, preferably as identified above as preferred) for layered buildup of molds and/or cores and/or feeder elements, preferably for layered buildup of molds and/or cores and/or feeder elements by 3D printing, wherein the contacting of a mold base material (D) and constituents of all of the said components (A), (B) and (C) of the binder system in one or more steps in step (S2) is effected by performing at least the following steps:

(S2-2-1) separately filtering constituents or amounts of the first liquid component (B) and of the second liquid component (C), so as to result in each case in a filtrate of the first liquid component (B) and second liquid component (C);

(S2-2-2) commixing the filtrates of the first liquid component (B) and of the second liquid component (C) that result from step (S-2-2-1), so as to result in a mixture of filtrates of the first liquid component (B) and second liquid component (C);

(S2-2-3) contacting the mixture of filtrates of the first liquid component (B) and the second liquid component (C) that results from step (S-2-2-2) with mold base material (D) and with component (A) of the binder system that has been precontacted with the mold base material (D).

Preference is given to a process of the invention (as described above, preferably as identified above as preferred) for layered buildup of molds and/or cores and/or feeder elements, preferably for layered buildup of molds and/or cores and/or feeder elements by 3D printing, wherein the contacting of a mold base material (D) and constituents of all of the said components (A), (B) and (C) of the binder system in one or more steps in step (S2) is effected by performing at least the following steps:

(S2-3-1) separately filtering constituents or amounts of the first liquid component (B) and of the second liquid component (C), so as to result in each case in a filtrate of the first liquid component (B) and second liquid component (C);

(S2-3-2) contacting, spatially separately and/or separately in time, the filtrates of the first liquid component (B) and of the second liquid component (C) that result from step (S-2-3-1) with mold base material (D) and with component (A) of the binder system that has been precontacted with the mold base material (D).

Preference is given to a process of the invention (as described above, preferably as identified above as preferred) for layered buildup of molds and/or cores and/or feeder elements, preferably for layered buildup of molds and/or cores and/or feeder elements by 3D printing, wherein the contacting of a mold base material (D) and constituents of all of the said components (A), (B) and (C) of the binder system in one or more steps in step (S2) is effected by performing at least the following steps:

(S2-4-1) filtering constituents or amounts of the first liquid component (B), so as to result in a filtrate of the first liquid component (B);

(S2-4-2) contacting the filtrate of the first liquid component (B) that results from step (S2-4-1) with mold base material (D), where mold base material (D) has been precontacted with the second liquid component (C) and with component (A) of the binder system.

All the preferred process configurations detailed are particularly preferred depending on the requirements of the individual case; the person skilled in the art will choose the process suitable in the particular case according to the respective requirements.

Preference is given to a process as just described, wherein, in step (S4), the curing, at least in portions, is effected at a temperature in the range from 100° C. to 300° C., more preferably in the range from 140° C. to 250° C., even more preferably at a temperature in the range from 160° C. to 200° C., preferably at a temperature of 170 to 190° C., and/or the shaped molding material mixture is heated in a heatable shaping mold and/or the shaped molding material mixture is heated by contact with hot air and/or the shaped molding material mixture is heated by the action of microwaves and/or the shaped molding material mixture is heated by passage of current and/or the shaped molding material mixture is cured using carbon dioxide and/or the shaped molding material mixture is cured using esters.

The heating of the shaped molding material mixture for thermal curing of the binder system can be effected, for example, in a mold having temperatures in the range from 100° C. to 300° C., more preferably temperatures in the range from 140° C. to 250° C., even more preferably in the range from 160° C. to 200° C., preferably temperatures in the range from 170 to 190° C. The thermal curing of the binder system in the shaped molding material mixture is preferably effected entirely or at least partly in a customary mold for industrial man-ufacture of molded articles.

The binder system in the shaped molding material mixture can be thermally cured here in suitable equip-ment and/or using suitable apparatus (such as conduits, pumps etc.) in which the thermal curing is assisted by controlled aeration of the shaped molding material mixture with air at controlled temperature. For this purpose, the air is preferably heated to 100° C. to 250° C., more preferably to 110° C. to 180° C.

The period of time for the thermal curing, i.e. including the period of time for the heating and for the controlled aeration of the shaped molding material mixture with air at controlled temperature, can be varied according to the requirements of the individual case and depend, for example, on the size and geometric characteristics of the shaped molding material mixture. Flow rate and/or volume flow of the air at controlled temperature in the controlled aeration of the shaped molding material mixture are preferably adjusted such that sufficient curing of the shaped molding material mixture for further processing or use is achieved within an acceptable period of time for industrial use, preferably a very short period of time. A period of less than 5 minutes is preferred in the context of the present invention, more preferably less than 2 minutes. In the case of very large molds or cores or feeder elements, according to the requirements of the individual case, however, longer periods of time may also be required.

The shaped molding material mixture may already have largely cured within the mold.

The process of the invention does not require complete curing of the binder system within the thermal curing step. "Thermal curing" in the context of the process of the invention as described above thus also does not include the complete curing of the binder. This corresponds to the understanding of the person skilled in the art of the term "curing", since it cannot be expected for reasons of reaction kinetics that the binder system will react throughout the volume of the shaped molding material mixture during the relatively short period of the thermal curing step. In this respect, for example, the person skilled in the art is aware of the phenomenon of further curing of the binder system (which has been thermally cured for example) in a foundry mold or a foundry core or a feeder element.

It is thus also possible in accordance with the invention to cure the binder system in the mold only in an edge region of the shaped molding material mixture, such that a sufficient strength (green strength) is achieved in order to be able to remove the shaped molding material mixture from the mold. Subsequently, the shaped molding material mixture can be cured further by removing further water (for example in a furnace or by evaporating the water under reduced pressure or in a microwave oven).

Thermal curing can also be brought about or assisted by the action of microwaves or by the action of electromagnetic radiation, especially infrared radiation, on the shaped molding material mixture.

Thermal curing can likewise be brought about or assisted by passage of electrical current through the shaped molding material mixture; details are disclosed, for example, in DE 10 2017 217098 B3 and the literature cited therein.

Curing can likewise be brought about or assisted by the use of carbon dioxide, as described, for example, in chapter 1.5.3 of the textbook Bührig-Polaczek, Michaeli and Spur: Handbuch Urformen [Primary Forming Handbook] (2013), Carl Hanser Verlag Gmbh & Co. KG, ISBN: 978-3-446-42035-9.

Curing can likewise be brought about or assisted by the use of esters, as described, for example, in GB 1029057 and in chapter 1.5.3 of the textbook Bührig-Polaczek, Michaeli and Spur: Handbuch Urformen (2013), Carl Hanser Verlag Gmbh & Co. KG, ISBN: 978-3-446-42035-9.

It is also possible to combine cold curing methods and applications in the additive manufacturing sector with processes of the invention.

The invention especially and preferably relates to a process (as described above, preferably as identified above as preferred) wherein the liquid components (B) and (C) are contacted in the absence of mold base material (D) and component (A), wherein
    the aqueous solution thus formed
    is not heated and subsequently cooled.

Preferably, warming or heating of the solution formed by external energy supply in the process of the invention does not take place prior to the contacting with mold base material (D) in step (S2). Preferably, cooling of the solution formed in the process of the invention does not take place prior to the contacting with mold base material (D) in step (S2).

Preference is given to a process of the invention (as described above, preferably as identified above as preferred) wherein the liquid components (B) and (C) are contacted in the absence of mold base material (D) and component (A), so as to result in a mixture of liquid components (B) and (C), wherein
    the resulting mixture of liquid components (B) and (C) is not filtered outside a printhead, preferably not filtered at all.

Preference is given to a process of the invention (as described above, preferably as identified above as preferred) wherein the liquid components (B) and (C) are contacted in the absence of mold base material (D) and component (A), so as to result in a mixture of liquid components (B) and (C), wherein
    the resulting mixture of liquid components (B) and (C) has a viscosity of less than 100 mPas, determined to ISO 12058-1 (1997 Apr. 1) using ball No. 3.

The invention especially and preferably relates to a process (as described above, preferably as identified above as preferred) wherein the liquid components (B) and (C) are contacted in the absence of mold base material (D) and component (A) to form an unstable preliminary mixture.

What is meant here by "unstable" is that the preliminary mixture is not storage-stable at 20° C. for at least 6 months, preferably not at 20° C. for at least 2 months.

Preference is given to a process of the invention (as described above, preferably as identified above as preferred) wherein
    the second liquid component (C) is first contacted with the mold base material (D), and only then is the first liquid component (B) added to the mixture of mold base material and liquid component (C).

In many cases, it is preferable when the second liquid component (C) is first contacted with the mold base material (D), and only then is the first liquid component (B) added to the mixture of mold base material and component (C); preference is likewise given in many cases, however, to a different sequence of contacting or simultaneous addition of the first liquid component (B) and the second liquid component (C) to the mold base material (D).

Preference is given to a process of the invention (as described above, preferably as identified above as preferred) wherein
    liquid components (B) and (C) are contacted with one another within a period of not more than 15 minutes, preferably within a period of not more than 5 minutes.

The "contacting" begins with the juncture at which a molecule of the first liquid component (B) makes contact with liquid component (C) or vice versa; it ends when both components have been used completely.

Preference is given to a process (as described above, preferably as identified above as preferred) wherein
    the temperature in the liquid components (B) and (C) on contacting thereof is in the range from 5 to 35° C.

The temperature is preferably within this range throughout the contacting operation.

Preference is given to a process (as described above, preferably as identified above as preferred) wherein
no step of the process includes a filtration outside a printhead; preferably, no step of the process includes a filtration.

The above-described effects and advantages are thus achieved in a particularly resource-conserving manner and in many cases in a particularly environmentally responsible manner.

The invention additionally relates to molds, cores, feeder elements and molding material mixtures for use in a foundry, produced or producible by a process as described above, preferably as identified above as preferred.

Molding material mixtures of the invention have preferably been produced or are producible by a process according to the above-defined first preferred configuration of the process of the invention. Molds, cores and feeder elements of the invention have preferably been produced or are producible by a process according to the above-defined second preferred configuration of the process of the invention.

According to the requirements of the individual case, all or individual aspects of the process of the invention as defined above, individually or in combination with one another, are particularly suitable for production of a mold of the invention, a core of the invention, a feeder element of the invention or a molding material mixture of the invention for use in a foundry. For production of molds of the invention, cores of the invention, feeder elements of the invention or molding material mixtures of the invention, the person skilled in the art will identify the aspects of the process of the invention that are preferred in the individual case and employ a correspondingly configured process.

The advantages and effects described above in connection with the process of the invention are achieved with molds of the invention, cores of the invention, feeder elements of the invention and molding material mixtures of the invention.

The invention additionally relates to an apparatus in a foundry for production of an article selected from the group consisting of molds, cores, feeder elements and molding material mixtures, at least comprising:
(i) separate reservoir vessels for or comprising:
a first liquid component (B) comprising waterglass, and
a second liquid component (C) comprising aluminate ions dissolved in an aqueous phase,
(ii) a (first) dosing device for metered addition of defined amounts of the first liquid component (B) and the second liquid component (C) to a vessel for the purpose of contacting with at least one mold base material (D) and particulate amorphous silicon dioxide.

Preferably, the first dosing device in the apparatus of the invention is configured such that defined amounts of the first liquid component (B) (from its reservoir vessel) and of the second liquid component (C) (from its reservoir vessel) are metered together into a vessel for the purpose of contacting with at least one mold base material (D) and particulate amorphous silicon dioxide.

Preferably, the dosing device of the inventive apparatus is configured such that the dosing is automated; preference is given to automated metered addition by means of an open-loop or closed-loop control device for the (first) dosing device. Particular preference is given to automated metered addition by means of a microprocessor-assisted open-loop or closed-loop control device for the (first) dosing device.

Preferably, the (first) dosing device of the apparatus of the invention is configured such that, when a process of the invention is performed outside the vessel, for the purpose of contacting with at least one mold base material (D) and particulate amorphous silicon dioxide, no amounts, preferably no amounts that are unacceptable in the field of the invention, of solids are formed from constituents or amounts of the first liquid component (B) and/or of the second liquid component (C).

Preference is given to an apparatus of the invention (as described above, preferably as identified above as preferred) for layered buildup of molds and/or cores and/or feeder elements.

By means of such an apparatus, the process of the invention can be conducted in a particularly time-saving and/or resource-conserving manner.

Preference is given to an apparatus of the invention (as described above, preferably as identified above as preferred), additionally at least comprising:
(iii) separate reservoir vessels for or comprising:
a component (A) comprising particulate amorphous silicon dioxide, and
a mold base material (D)
(iv) a (second) dosing device for metered addition of defined amounts of
constituents or amounts of component (A) comprising particulate amorphous silicon dioxide
and
the mold base material (D)
for the purpose of contacting with at least waterglass and aluminate ions.

Preferably, this (second) dosing device of the apparatus of the invention is configured such that the dosing of defined amounts of component (A) comprising particulate amorphous silicon dioxide (from its reservoir vessel) and of mold base material (D) (from its reservoir vessel) is effected collectively into a vessel for the purpose of contacting with at least waterglass and aluminate ions.

Preferably, the (second) dosing device of the apparatus of the invention is configured such that the metered addition is automated; preference is given to automated metered addition by means of an open-loop or closed-loop control device for the (second) dosing device, particular preference to automated metered addition by means of a microprocessor-assisted open-loop or closed-loop control device for the (second) dosing device.

It is preferably possible by means of the apparatus of the invention, especially an apparatus of the invention for layered buildup of molds and/or cores and/or feeder elements, to produce molds and/or cores and/or feeder elements of the invention, especially molds and/or cores and/or feeder elements of the invention that have a complex mold and/or core and/or feeder element geometry, in a process of the invention; this is accomplished in apparatuses of the invention in a particularly time-saving, resource-conserving and additionally, in many cases, particularly environmentally responsible manner.

Preference is additionally given to an apparatus of the invention (as described above, preferably as identified above as preferred) comprising:
an open-loop or closed-loop control device, preferably a microprocessor-assisted open-loop or closed-loop control device, for automated metered addition, by means of at least one dosing device, of constituents or amounts of the first liquid component (B) and of the second liquid component (C) in a defined ratio, so as to result in a mixture comprising at least water glass and aluminate ions;
and/or
an open-loop or closed-loop control device, preferably a microprocessor-assisted open-loop or closed-loop control device, for automated metered addition, by means of at least one dosing device, of constituents or amounts of the first liquid component (B) and of the second liquid component (C), preferably for automated metered addition of constituents or amounts of component (A) comprising particulate amorphous silicon dioxide, of the first liquid component (B) and of the second liquid component (C), more preferably for automated metered addition of mold base material (D) and constituents or amounts of component (A) comprising particulate amorphous silicon dioxide, of the first liquid component (B) and of the second liquid component (C).

It is preferably possible by means of the apparatus of the invention, especially an apparatus of the invention for layered buildup of molds and/or cores and/or feeder elements, to conduct the process of the invention in a particularly time-saving and resource-conserving manner; it is particularly preferable here when the open-loop or closed-loop control device, preferably the microprocessor-assisted open-loop or closed-loop control device, for automated metered addition by means of at least one dosing device in the layered buildup of molds and/or cores and/or feeder elements also controls this layered buildup.

The invention additionally relates to the use of an apparatus of the invention (as described above, preferably as identified above as preferred) for performance of a process (as described above, preferably as identified above as preferred).

Particular preference is given to performing a process of the invention using an apparatus of the invention; this achieves the above-described effects and advantages in a very particularly efficient manner.

The invention additionally relates to the use of a liquid component comprising aluminate ions dissolved in an aqueous phase, preferably dissolved alkali metal aluminates, as the second liquid component (C) of a curable binder system comprising:
a component (A) comprising particulate amorphous silicon dioxide
and
a first liquid component (B) comprising waterglass,
for increasing the moisture resistance of a molding comprising a mold base material (D) bound by the cured binder system.

The use of the invention leads to a surprisingly high moisture resistance of the respective moldings, in each case compared to a molding of otherwise identical composition and mode of production, but without the use of the second liquid component (C). It is also possible to further improve the effect known from the prior art that lithium- and/or boron-containing compounds increase moisture resistance through the inventive use of a liquid component comprising aluminate ions dissolved in an aqueous phase, preferably dissolved alkali metal aluminates, as the second liquid component (C) of an above-described binder system.

The invention additionally relates to the use of a liquid component (C) comprising aluminate ions dissolved in an aqueous phase, preferably dissolved alkali metal aluminates, for production of an article by a process of the invention as described above, preferably as identified above as preferred, i.e. for production of a mold of the invention, a core of the invention, a feeder element of the invention or a molding material mixture of the invention.

The advantages and effects described above in connection with the process of the invention are achieved in the case of inventive use of a liquid component (C) comprising aluminate ions dissolved in an aqueous phase, preferably dissolved alkali metal aluminates.

The invention additionally relates to the use of a component (A) comprising particulate amorphous silicon dioxide, a first liquid component (B) and a second liquid component (C), each as described above, preferably each as identified above as preferred, for production of a binder, wherein the first liquid component (B) and the second liquid component (C) are mixed in a mass ratio in the range from 86:1 to 1:1, preferably in the range from 20:1 to 2:1, more preferably in the range from 10:1 to 3:1.

The advantages and effects described above in connection with the process of the invention are achieved in a particularly efficient manner in a use with the mass ratios specified.

The invention is elucidated in detail hereinafter by examples.

Example 1—Determination of Particle Size Distribution by Means of Laser Scattering The selection of the substances in this example is merely illustrative, and it is also possible to determine particle size distributions or medians of other particulate silicon dioxide species to be used in accordance with the invention by means of laser scattering according to the procedure in this example.

1.1 Sample Preparation:

By way of example, particle size distributions of silica fume particles (CAS number: 69012-64-2) that are commercially available (from RW Silicium GmbH) and in particulate powder form from Si production, RW filler sieved ["RW-Füller gesiebt"], and from $ZrO_2$ production, RW filler Q1 Plus ["RW-Füller Q1 plus"], were determined experimentally by means of laser scattering.

In each case, about 1 teaspoon of the particulate silicon dioxide was admixed with about 100 mL of demineralized water, and the resultant mixture was stirred with a magnetic stirrer (IKAMAG RET) at a stirrer speed of 500 revolutions per minute for 30 seconds. Subsequently, an ultrasound probe (from Hielscher; model: UP200HT) preadjusted to 100% amplitude, equipped with the S26d7 sonotrode (from Hielscher), was immersed into the sample, and the sample was sonicated therewith. The sonication was continuous (not pulsed). For the silica fume particles examined from Si production, RW filler sieved, and from $ZrO_2$ production, RW filler Q1 plus, optimal sonication times of 300 seconds (for RW filler sieved) or 240 seconds (for RW filler Q1 Plus) were chosen, which had been ascertained beforehand as described in example 2.

1.2 Laser Scattering Measurements:

The measurements were conducted with a Horiba LA-960 instrument (LA-960 hereinafter). For the measurements, circulation speed was set to 6, stirrer speed to 8, data recording for the sample to 30 000, convergence factor to 15, the mode of distribution to volume, and refractive index (R) to 1.50-0.01 i (1.33 for demineralized water dispersion medium) and refractive index (B) to 1.50-0.01 i (1.33 for demineralized water dispersion medium). Laser scattering measurements were conducted at room temperature (20° C. to 25° C.).

The measurement chamber of the LA-960 was filled to an extent of three quarters with demineralized water (maximum fill level). Then the stirrer was started at the set speed, the circulation was switched on and the water was degassed. Subsequently, a zero measurement was conducted with the parameters specified.

A disposable pipette was then used to take a 0.5-3.0 ml sample centrally from the sample prepared according to point 1.1 of the present example 1 immediately after the ultrasound treatment. Subsequently, the complete contents of the pipette were introduced into the measurement chamber, such that the transmittance of the red laser was between 80% and 90% and the transmittance of the blue laser was between 70% and 90%. Then the measurement was started. The measurements were evaluated in an automated manner on the basis of the parameters specified. For the silica fume particles examined from Si production (RW filler sieved), a particle size distribution was ascertained with a median of 0.23 micrometer, rounded to the second post-decimal place.

For the silica fume particles examined from $ZrO_2$ production (RW filler Q1 Plus), a particle size distribution was ascertained with a median of 0.84 micrometer, rounded to the second post-decimal place.

Example 2—Determination of Optimal Sonication Time

The optimal duration of ultrasound sonication, which is dependent on the type of sample, was ascertained by conducting a measurement series with different sonication times for each species of particulate silicon dioxide. This was done by extending the sonication time, starting from 10 seconds, by 10 seconds each time for every further sample, and determining the respective particle size distribution by means of laser scattering (LA-960) immediately after the end of sonication as described in point 1.2 of the present example 1. With increasing duration of sonication, the median ascertained in the particle size distribution fell at first, until it ultimately rose again at longer sonication times. For the ultrasound sonications described in point 1.1 of the present example 1, the sonication time chosen was that at which, in these measurements series, the lowest median of the particle size distribution was determined for the respective particle species; this sonication time is the "optimal" sonication time.

Example 3—Production of Alkali Metal Aluminate Solutions

This example describes, by way of example, the production of an alkali metal aluminate solution. The concentrations used here are merely by way of example, and it is also possible to use other concentrations; with regard to the corresponding properties see the above description.

3.1 Production of a Potassium Aluminate Solution

For production of a potassium aluminate solution having a molar ratio of potassium oxide to aluminum oxide of 2.5:1 1 (also referred to hereinafter as "potassium aluminate soln. 1:2.5" or "potassium aluminate solution 1:2.5"), according to formulation 2019311 specified in table 1a (respectively identical formulation numbers in the present text each denote identical compositions), an initial charge of 45 percent potassium hydroxide was equilibrated to a temperature of 93±2° C. while stirring.

TABLE 1a

|  | Formulation | |
|---|---|---|
|  | 2019311 % by wt. | 2019315 % by wt. |
| Water | — | 2.37 |
| NaOH 33%[1] | — | 77.63 |
| KOH 45%[2] | 80.00 | — |
| Apyral NH20[3] | 20.00 | 20.00 |
| Total | 100.00 | 100.00 |

[1]33% Spezial sodium hydroxide solution (CG Chemikalien, w = 32-34%, CAS No.: 1310-73-2)
[2]45% potassium hydroxide solution (CG Chemikalien, w = 44.7-45.3%, CAS No.: 1310-58-3)
[3]Apyral NH20 (Nabaltec AG, aluminum hydroxide, w > 99.7%, CAS No.: 21645-51-2)

Then aluminum hydroxide powder (Apyral $NH_2O$, according to formulation 2019311, table 1a) was added with continuous stirring. The resultant mixture was heated to a temperature of 95° C.+2° C. and kept at that temperature until the solution was clear to the eye. Subsequently, the solution was cooled down to room temperature.

The molar composition of the resulting potassium aluminate solution according to formulation 2019311 is apparent from table 1b.

TABLE 1b

|  | 2019311 | 2019315 |
|---|---|---|
| $H_2O$ [mol %] | 87.50 | 89.23 |
| $Na_2O$ [mol %] | 0.00 | 7.69 |
| $K_2O$ [mol %] | 8.93 | 0.00 |
| $Al_2O_3$ [mol %] | 3.57 | 3.08 |
| MR[4] | 2.5 | 2.5 |

[4]MR means molar ratio (MR) between $M_2O$ (with M = Na or K) and $Al_2O_3$ in the aluminate solution.

3.2 Production of a Sodium Aluminate Solution

For production of a sodium aluminate solution having a molar ratio of sodium oxide to aluminum oxide of 2.5:1 (also referred to hereinafter as "sodium aluminate soln. 1:2.5" or "sodium aluminate solution 1:2.5"), according to formulation 2019315 specified in table 1a, a 33 percent sodium hydroxide solution was added to an initial charge of water and equilibrated to a temperature of 93±2° C. while stirring.

Then aluminum hydroxide powder (Apyral $NH_2O$, according to formulation 2019315, table 1a) was added with continuous stirring. The resultant mixture was heated to a temperature of 95° C.+2° C. and kept at that temperature until the solution was clear to the eye. Subsequently, the solution was cooled down to room temperature.

The molar composition of the resulting sodium aluminate solution according to formulation 2019315 is apparent from table 1b.

Example 4—Example Calculations for Determination of the Percentages by Weight of Water and Metal Oxides 4.1 Percentage by Weight of $Na_2O$ The calculation below shows by way of example that the 33 percent NaOH solution used in formulation 2019315 formally comprises 25.6% by weight of $Na_2O$ in water. It is also possible to conduct corresponding calculations analogously for other concentrations.

The basis used here is the following equation:

$$Na_2O + H_2O \rightarrow 2NaOH$$

It follows that:

% by wt. (Na$_2$O) =

$$\frac{M(Na_2O)}{2 \cdot M(NaOH)} \cdot 100\% \text{ by wt.} = \frac{61.98 \frac{g}{mol}}{79.99 \frac{g}{mol}} \cdot 100\% \text{ by wt.} = 77,5\% \text{ by wt.}$$

In other words, NaOH contains 77.5% by weight of Na$_2$O. It follows that, for a 33 percent NaOH solution:
% by wt. (Na$_2$O in 33% NaOH)=33·77.5% by wt./100=25.6% by wt.
% by wt. (H$_2$O in 33% NaOH)=(100−25.6) % by wt.=74.4% by wt.

4.2 Percentage by Weight of K$_2$O

Analogously, a proportion of 37.8% by weight of K$_2$O is found for the 45 percent KOH solution in water used in formulation 2019311.

4.3 Percentage by Weight of Li$_2$O

Analogously, a proportion of 35.6% by weight of Li$_2$O is found for the LiOH monohydrate used in example 14.

The basis used here is the following equation:

$$Li_2O + 3H_2O \rightarrow 2LiOH \cdot H_2O$$

4.4 Percentage by Weight of Sodium Aluminate Solution

The calculation below shows how the composition of a sodium aluminate solution is calculated analogously.

The basis used here (beyond the basis according to 4.1) is the following equation:

$$Al_2O_3 + 3\ H_2O \rightarrow 2Al(OH)_3$$

It follows that:

$$\% \text{ by wt. } (Al_2O_3) = \frac{M(Al_2O_3)}{2 \cdot M(Al(OH)_3)} \cdot 100\% \text{ by wt.} =$$

$$\frac{101.95 \frac{g}{mol}}{156.01 \frac{g}{mol}} \cdot 100\% \text{ by wt.} = 65.4\% \text{ by wt.}$$

It follows that, for the solution according to formulation 2019315:
% by wt. (Al$_2$O$_3$ in 2019315)=(20· 65.4% by wt.)/100=13.08% by wt.
% by wt. (Na$_2$O in 2019315)=(77.63· 25.6% by wt.)/100=19.87% by wt.
% by wt. (H$_2$O in 2019315)=(100−(13.08+19.87)) % by wt.=67.05% by wt.

4.5 Percentage by Weight of Potassium Aluminate Solution

Analogously, for the composition of a potassium aluminate solution according to formulation 2019311, a proportion of 30.24% by weight of K$_2$O and 56.68% by weight of H$_2$O is found.

4.6 Percentage by Weight of B$_2$O$_3$

Analogously, a proportion of 36.5% by weight of B2O$_3$ and 16.3% by weight of Na$_2$O is found for the sodium tetraborate 10-hydrate used in example 14.

The basis used here is the following equation:

$$Na_2[B_4O_5(OH)_4] \cdot 8H_2O \rightarrow Na_2O + 2B_2O_3 + 10H_2O$$

Example 5—Production of Molding Material Mixtures

The production of molding material mixtures is described by way of an example formulation. The composition of the molding material mixtures is merely illustrative; the selection of substances used is also merely illustrative.

Unless stated otherwise, for the formulations specified in the present text of the examples (here, solely by way of example, the formulation according to table 2a), the liquid components (B) produced or provided (first liquid component, comprising waterglass) and (C) (second liquid component, comprising aluminate ions dissolved in an aqueous phase) are contacted with the component (A) produced or provided (component comprising amorphous silicon dioxide) and the mold base material (component D)) in such a way that the predetermined ratios according to table 2b exist (at least) in the contacting. The exact relative ratios of the liquid components (B) and (C) to one another are each apparent from the formulations detailed.

TABLE 2a

Example formulation for liquid components of the molding material mixture

| | Liquid component | Formulation 2019321 % by wt. |
|---|---|---|
| Water | (B) | 12.70 |
| NaOH 33% | (B) | 12.90 |
| 48/50 HV waterglass[5] | (B) | 67.40 |
| EHS surfactant[6] | (B) | 0.50 |
| Sodium aluminate soln. 1:2.5 | (C) | 6.50 |
| Total | (B) + (C) | 100.00 |

[5]48/50 sodium waterglass (from BTC Europe GmbH)
[6]Here and hereinafter: 2-ethylhexyl sulfate in water (from Hoesch)

TABLE 2b

Predetermined ratios on contacting

| Component | Liquid component | PW[7] |
|---|---|---|
| (A) | | 0.6 |
| | (B) + (C) | 2.1 |
| (D) | | 100 |

[7]PW (here and hereinafter) means part(s) by weight 5.1 Procedure:
(a) For the purposes of this example, an amount of the particulate amorphous silicon dioxide species "RW-Füller gesiebt" (with a median of the particle size distribution, rounded to the second post-decimal place, determined by means of laser scattering, of 0.23 micrometer) and an amount of the particulate amorphous silicon dioxide species "RW-Füller Q1 Plus" (with a median of the particle size distribution, rounded to the second post-decimal place, determined by means of laser scattering, of 0.84 micrometer) were first dry-mixed with one another in a weight ratio of 1:1 (as an example of a component (A) comprising particulate amorphous silicon dioxide). Unless stated otherwise in the context of the text of the examples, the 1:1 mixture described here was always used as component (A) comprising particulate amorphous silicon dioxide.
(b) In a separate vessel (as an example of a first liquid component (B), comprising waterglass), a waterglass binder was provided with a composition according to liquid component (B) from table 2a. Note: In further examples, this procedure is applied to other compositions that are then specified in each case.

(c) In a separate vessel, a sodium aluminate solution was provided (prepared according to the above example 3.2; as an example of a second liquid component (C), comprising aluminate ions dissolved in an aqueous phase) having a molar ratio of sodium oxide and aluminum oxide of 2.5:1. Note: In further examples, this procedure is applied to other compositions that are then specified in each case.

(d) In a contacting vessel, 100 PW of H32 quartz sand (from Quarzwerke GmbH, AFS grain fineness number 45) were provided and 0.6 PW of the 1:1 mixture of "RW-Füller gesiebt" and "RW-Füller Q1 Plus" described above in this example under (a) was mixed manually with the sand so as to result in a preliminary mixture.

(e) Then liquid components (B) and (C), according to the relative ratios specified in table 2a, were each added individually to this preliminary mixture of solids in a total proportion of 2.1 PW (for the relative ratios specified in table 2a, added amounts of 0.1365 PW of the liquid component (C) defined therein and 1.9635 PW of the liquid component (B) defined therein are found here by way of example; the added amounts overall are thus: 0.1365 PW+1.9635 PW=2.1 PW). This was followed by mixing in a bull mixer (RN10/20 type, from Morek Multiserw) at 220 rpm for 120 seconds. This resulted in a molding material mixture as an example of an article for use in the foundry industry. The molding material mixture was suitable for production of molds, cores and feeder elements and was used accordingly in further in-house studies.

Example 6—Production of Test Bars

This example describes, by way of example, the production of test bars as an example of molds (moldings) or cores for the foundry industry; the dimensions of the test bars and the selection of substances used is merely by way of example.

6.1 Procedure

Molding material mixtures produced according to example 5 were formed to test bars having the dimensions of 22.4 mm×22.4 mm×185 mm. (Note: Molding material mixtures produced from other compositions according to the procedure from example 5.1 were also processed in the manner described here to give test bars).

For this purpose, the molding material mixtures were introduced with compressed air (4 bar) and a shooting time of 3 seconds into a mold for test bars having a temperature of 180° C. Subsequently, the test bars were hot-cured at 180° C. for 30 seconds, while additionally being aerated with heated compressed air at an aeration pressure of 2 bar and an aeration and aeration hose temperature of 180° C. for the duration of the curing. Thereafter, the mold was opened and the cured test bars were removed. After removal from the mold, the test bars produced, for cooling under ambient air, were placed horizontally on a frame such that they rested on the frame only in the region of the two ends of their longest extent, and the test bars spanned a range of about 16 cm without contact between the contact surfaces.

Example 7—Determination of Core Weight

The test bars produced according to example 6, after a cooling time of about 1 hour under ambient air, were weighed on a laboratory balance (Entris 3202-1S type, from Sartorius). The core weight figures included in examples that follow correspond to an average from nine individual measurements (note: core weight was also determined in the manner described here for test bars produced from other molding material mixtures according to the procedure from example 6.1).

Example 8—Determination of Hot Strength

Immediately after removal from the mold (i.e. before storage on a frame as described in example 6), test bars produced according to example 6 were introduced into a Georg Fischer strength tester, equipped with a 3-point bending device (from Morek Multiserw). 15 seconds after the mold had been opened, the force that led to fracture of the test bars was measured. The respective hot strength figure (in $N/cm^2$) corresponds in each case to an average from three individual measurements and is rounded to 10 $N/cm^2$ (note: hot strength was also determined in the manner described here for test bars produced from other molding material mixtures according to the procedure from example 6.1).

Example 9—Determination of One-Hour Strength

Test bars were produced according to example 6. After a cooling time of 1 hour (under ambient air and on the frame described in the above example 6) after removal from the mold, the respective test bars were introduced into a Georg Fischer strength tester, equipped with a 3-point bending device (from Morek Multiserw), and the force that led to fracture of the test bars was measured. The respective one-hour strength figure (in $N/cm^2$) corresponds in each case to an average from three individual measurements and is rounded to 10 $N/cm^2$ (note: one-hour strength was also determined in the manner described here for test bars produced from other molding material mixtures according to the procedure from example 6.1).

Example 10—Determination of Moisture Stability

Test bars, after a cooling time of 1 hour (under ambient air and on the frame described in the above example 6) on their respective frame, were stored under controlled conditions in a climate-controlled cabinet (VC 0034, from Vötsch) at 35° C. and 75% rel. humidity. For evaluation, the test bars were monitored by a camera (HomeVista type, from SECACAM). A photo of the test bars was taken every 10 minutes until they fractured; the time of the last photo on which the test bar has not completely broken is considered to be the measured time for moisture stability. The moisture stabilities reported each correspond to an average from three individual measurements (note: moisture stability was also determined in the manner described here for test bars produced from other molding material mixtures according to the procedure from example 6.1).

Example 11—Determination of Casting Quality with Regard to Sand Adhesion

Test bars produced according to example 6 were placed into an outer sand mold in such a way that three of the four longitudinal sides of the core in each case came into contact with the molten metal in the casting process. The casting molds thus prepared were used to cast an aluminum alloy (EN AC-42100) at a casting temperature of about 750° C. After the melt had cooled, the castings were unpacked from the sand mold, the test bars were removed by high-frequency hammer impacts on the feeding region of the casting with a compressed air chipping hammer (P 2535 Pro type, from Atlas Copco), and the casting surface that was in contact with the test bar was blown with a compressed air gun. For each test bar composition, two corresponding castings were conducted in separate casting molds.

For relative comparison of casting quality, the casting surfaces that were in contact with the cores were assessed from the best casting quality to the worst casting quality for each mold. The assessment was conducted independently by two testers having several years of experience in the field of foundry technology. Casting quality was also determined for test bars produced from other molding material mixtures according to the procedure from example 6.1 in the manner described here.

Example 12—Determination of High-Temperature Properties

Deformation under thermal stress was conducted analogously to the method specified in EP 2 097 192 B1 (cf. in particular paragraphs [0096]-[0099] in EP 2 097 192 B1), using a Hot Distortion Tester from Simpson Technologies Corporation. The results obtained with this instrument, from the point of view of the person skilled in the art, are equivalent to the results that were determined by means of hot distortion measurements by the BCIRA hot distortion test.

The test bars used here were produced according to example 6, with the sole difference that the test bars produced and used for the hot distortion tests had the dimensions of 25 mm×6 mm×120 mm and were placed on two supports such that the air can circulate freely around the test bars.

The effect of heating from one side during the hot distortion test is that the test specimen bends upward toward the cold side as a result of the thermal expansion of the hot side. This movement of the test specimen is labeled as "maximum expansion" in the curve. To the same extent as that to which the test specimen heats up overall, the binder begins to be converted to the thermoplastic state. On account of the thermoplastic properties of the various binder systems, the load applied by the load arm pushes the test specimen back downward. This downward movement along the ordinate at the zero line until fracture is referred to as "hot deformation". The time elapsed between the commencement of the maximum expansion on the curve and fracture is referred to as "time until fracture" and is an important parameter.

By virtue of the apparatus, maximum thermoplastic deformation in the tests conducted is limited to 6 mm (deformation-6 mm). This point is therefore equated to the occurrence of a fracture.

High-temperature properties were also determined for test bars produced from other formulations according to the procedure from example 6.1 in the manner described here.

Example 13—Increase in the Aluminate Ion Content in the Binder

In order to represent the influence of the amount of aluminate ions used in the binder system, according to the procedure of example 5, molding material mixtures having a composition of liquid components (B) and (C) according to tables 3a and 3b were produced; the (calculated) molar compositions present in a mixture of liquid components (B) and (C) (according to the formulations from tables 3a and 3b) are reported in table 3c. Formulations 2019327, 2019321, 2019328 and 2019329 are inventive examples; formulation 2019326 is a noninventive comparative example (unlike in the process of the invention, no liquid component (C) comprising aluminate ions dissolved in an aqueous phase is used).

TABLE 3a

|  | Liquid component | Formulation | | |
| --- | --- | --- | --- | --- |
|  |  | 2019326 | 2019327 | 2019321 |
| Water | (B) | 13.55 | 13.10 | 12.70 |
| NaOH 33% | (B) | 18.10 | 15.50 | 12.90 |
| 48/50 HV waterglass | (B) | 67.85 | 67.65 | 67.40 |
| EHS surfactant | (B) | 0.50 | 0.50 | 0.50 |
| Sodium aluminate soln. 1:2.5 | (C) |  | 3.25 | 6.50 |
| Total | (B) + (C) | 100.00 | 100.00 | 100.00 |

TABLE 3b

|  |  | Formulation | |
| --- | --- | --- | --- |
|  | Liquid component | 2019328 | 2019329 |
| Water | (B) | 12.20 | 11.80 |
| NaOH 33% | (B) | 10.40 | 7.90 |
| 48/50 HV waterglass | (B) | 67.15 | 66.90 |
| EHS surfactant | (B) | 0.50 | 0.50 |
| Sodium aluminate soln. 1:2.5 | (C) | 9.75 | 12.90 |
| Total | (B) + (C) | 100.00 | 100.00 |

TABLE 3c

| Formulation | 2019326 | 2019327 | 2019321 | 2019328 | 2019329 |
| --- | --- | --- | --- | --- | --- |
| $H_2O$ [mol %] | 85.92 | 85.81 | 85.71 | 85.60 | 85.50 |
| $SiO_2$ [mol %] | 9.06 | 9.06 | 9.06 | 9.06 | 9.06 |
| $Na_2O$ [mol %] | 5.03 | 5.03 | 5.03 | 5.03 | 5.03 |
| $Al_2O_3$ [mol %] | 0.00 | 0.10 | 0.20 | 0.30 | 0.40 |
| MR[8] | 1.80 | 1.80 | 1.80 | 1.80 | 1.80 |

[8]MR (here and hereinafter) means molar ratio of $SiO_2$ to $Na_2O$ in the solution.

According to the procedure from example 6, these molding material mixtures were used to produce test bars.

The formulations for the molding material mixtures were chosen here such that, even with a rising aluminum content, there was a uniform molar modulus (MR), a uniform $SiO_2$ content and a uniform $Na_2O$ content in the respectively used amounts of liquid components (B) and (C).

For each of the formulations specified in tables 3a and 3b, a sufficient number of test bars were produced in order to determine core weight (according to example 7), hot strength (according to example 8), one-hour strength (according to example 9) and moisture stability (according to example 10); the results of these determinations are reported in table 4.

TABLE 4

| Formulation | 2019326 | 2019327 | 2019321 | 2019328 | 2019329 |
|---|---|---|---|---|---|
| Core weight | 148.52 | 148.60 | 148.57 | 147.97 | 147.99 |
| Hot strength [N/cm$^2$] | 180 | 180 | 190 | 180 | 190 |
| One-hour strength [N/cm$^2$] | 550 | 510 | 540 | 480 | 490 |
| Moisture stability [min] | 453 | 840 | 1207 | 2067 | 1550 |

Even in the case of a composition with 0.10 mol % of Al$_2$O$_3$ (based on the combined total mass of liquid components (B) and (C) used; cf. table 3c), a significant increase in moisture stability was observed. For compositions with 0.2 mol %, 0.3 mol % and 0.4 mol % of Al$_2$O$_3$, compared to the (noninventive) comparative molding material mixture 2019326 devoid of aluminate ions, increases in moisture stability by more than a factor of 2 were even measured.

Hot strengths and one-hour strengths of all test bars were above the demands for industrial purposes.

For formulations 2019326, 2019321 and 2019329, additional test bars (according to example 6) were produced and the casting surface (according to example 11) was determined. For both cast parts each containing a test bar of formulations 2019326, 2019321 and 2019329, irrespective of the tester conducting the assessment, the sequence of casting quality was determined as follows: 2019329>2019321>2019326. For compositions with 0.2 mol % and 0.4 mol % of Al$_2$O$_3$, accordingly, compared to the (noninventive) comparative molding material mixture 2019326 devoid of aluminate ions, an improvement in casting quality was found.

For formulations 2019326, 2019321 and 2019329, additional test bars were produced and examined according to example 12. The more aluminate ions are present in the binder, the lower the slope (deformation per unit time) before attainment of the thermoplastic region. Thus, the region of the thermoplastic state for the comparative molding material mixture 2019326 devoid of aluminate ions sets in after 9 s, for a composition with 0.2 mol % after 10 s, and for a composition with 0.4 mol % actually not until 22 s. The total measurement time until fracture also increases with increasing amount of aluminate ions in the binder. In the case of the comparative molding material mixture, fracture occurs after a total time of 31 s, whereas fracture occurs after a total time of 35 s for a composition with 0.2 mol %, and fracture occurs only after a total time of 40 s for a composition with 0.4 mol %.

Example 14—Influence of Aluminum, Lithium and Boron Ions on Moisture Stability

According to the procedure of example 5, molding material mixtures having a composition of liquid components (B) and (C) according to tables 5a and 5b were produced; the (calculated) molar compositions present in a mixture of liquid components (B) and (C) (according to the formulations from tables 5a and 5b) are reported in table 5c. Formulations 2019321, 2019441 and 2019446 are inventive examples; formulations 2019326, 2019442 and 2019445 are noninventive comparative examples (unlike in the process of the invention, no liquid component (C) comprising aluminate ions dissolved in an aqueous phase is used).

TABLE 5a

| Liquid component | | Formulation | | |
| | | 2019326 | 2019321 | 2019442 |
|---|---|---|---|---|
| Water | (B) | 13.55 | 12.70 | 13.30 |
| NaOH 33% | (B) | 18.10 | 12.90 | 17.10 |
| 48/50 HV waterglass | (B) | 67.85 | 67.40 | 67.55 |
| LiOH monohydrate | (B) | | | |
| Sodium tetraborate 10-hydrate | (B) | | | 1.55 |
| EHS surfactant | (B) | 0.50 | 0.50 | 0.50 |
| Sodium aluminate soln. 1:2.5 | (C) | | 6.50 | |
| Total | (B) + (C) | 100.00 | 100.00 | 100.00 |

TABLE 5b

| Liquid component | | Formulation | | |
| | | 2019445 | 2019441 | 2019446 |
|---|---|---|---|---|
| Water | (B) | 14.625 | 12.50 | 13.675 |
| NaOH 33% | (B) | 16.15 | 11.85 | 11.10 |
| 48/50 HV waterglass | (B) | | 67.10 | 67.55 |
| LiOH monohydrate | (B) | 0.675 | | 0.675 |
| Sodium tetraborate 10-hydrate | (B) | | 1.55 | |
| EHS surfactant | (B) | 0.50 | 0.50 | 0.50 |
| Sodium aluminate soln. 1:2.5 | (C) | | 6.50 | 6.50 |
| Total | (B) + (C) | 100.00 | | |

TABLE 5c

| Formulation | 2019326 | 2019321 | 2019442 | 2019445 | 2019441 | 2019446 |
|---|---|---|---|---|---|---|
| H$_2$O [mol %] | 85.92 | 85.71 | 85.71 | 85.92 | 85.51 | 85.70 |
| SiO$_2$ [mol %] | 9.06 | 9.06 | 9.06 | 9.06 | 9.06 | 9.06 |
| Na$_2$O [mol %] | 5.03 | 5.03 | 5.03 | 4.83 | 5.03 | 4.84 |
| Li$_2$O [mol %] | | | | 0.19 | | 0.19 |
| B$_2$O$_3$ [mol %] | | | 0.20 | | 0.20 | |
| Al$_2$O$_3$ [mol %] | 0.00 | 0.20 | | | 0.20 | 0.20 |
| MR | 1.80 | 1.80 | 1.80 | 1.80 | 1.80 | 1.80 |

According to the procedure from example 6, these molding material mixtures were used to produce test bars.

For each of the formulations specified in tables 5a and 5b, a sufficient number of test bars were produced in order to determine core weight (according to example 7), hot strength (according to example 8), one-hour strength (according to example 9) and moisture stability (according to example 10); the results of these determinations are reported in table 6.

TABLE 6

| Formulation | 2019326 | 2019321 | 2019442 | 2019445 | 2019441 | 2019446 |
|---|---|---|---|---|---|---|
| Core weight | 148.50 | 148.32 | 148.44 | 148.40 | 148.35 | 148.21 |
| Hot strength [N/cm$^2$] | 180 | 180 | 160 | 170 | 180 | 190 |
| One-hour strength, cold [N/cm$^2$] | 560 | 520 | 510 | 530 | 480 | 500 |
| Moisture stability [min] | 563 | 1263 | 783 | 1087 | 2000 | 2340 |

The results show the influence of aluminate ions in the binder on moisture stability (and on further properties) of the moldings produced with this binder compared to the lithium compounds and boron compounds used to date in binders for increasing moisture stability. As a (noninventive) reference, a binder having an otherwise identical molar composition, but without one of the three moisture stability promoters, was tested (formulation 2019326).

The results show that the positive influence of the aluminate ions on moisture stability is greater than in the comparative examples with lithium compounds and boron compounds. Moreover, the results show that the use of aluminate ions in addition to boron compounds or lithium compounds brings about an additional increase in moisture stability compared to the sole use of boron compounds or lithium compounds.

Hot strengths and one-hour strengths of all test bars were above the demands for industrial purposes.

Example 15—Comparison of Potassium Aluminate Solution with Sodium Aluminate Solution in the Binder According to the procedure of example 5, molding material mixtures having a composition of liquid components (B) and (C) according to table 7a were produced; the (calculated) molar compositions present in a mixture of liquid components (B) and (C) (according to the formulations from table 7a) are reported in table 7b. Formulations 2019387 and 2019551 are inventive examples. With an otherwise identical composition of the liquid components of the binder system, the aluminate ions were introduced once in the form of a potassium aluminate solution (formulation 2019551) and once in the form of a sodium aluminate solution (formulation 2019387).

TABLE 7a

| | Liquid component | Formulation 2019387 | Formulation 2019551 |
|---|---|---|---|
| Water | (B) | 11.80 | 13.15 |
| NaOH 33% | (B) | 7.90 | 5.50 |
| 48/50 HV waterglass | (B) | 66.90 | 65.850 |

TABLE 7a-continued

| | Liquid component | Formulation 2019387 | Formulation 2019551 |
|---|---|---|---|
| EHS surfactant | (B) | 0.50 | 0.50 |
| Potassium aluminate solution 1:2.5 | (C) | | 12.50 |
| Sodium aluminate soln. 1:2.5 | (C) | 12.90 | |
| Total | (B) + (C) | 100.00 | 100.00 |

TABLE 7b

| Formulation | 2019387 | 2019551 |
|---|---|---|
| H$_2$O [mol %] | 85.50 | 85.50 |
| SiO$_2$ [mol %] | 9.06 | 9.06 |
| Na$_2$O [mol %] | 5.03 | 3.79 |
| K$_2$O [mol %] | | 1.25 |
| Al$_2$O$_3$ [mol %] | 0.40 | 0.40 |
| MR | 1.80 | 1.80 |

According to the procedure from example 6, these molding material mixtures were used to produce test bars.

For each of the formulations specified in table 7a, a sufficient number of test bars were produced in order to determine core weight (according to example 7), hot strength (according to example 8), one-hour strength (according to example 9) and moisture stability (according to example 10); the results of these determinations are reported in table 8.

TABLE 8

| | 2019387 | 2019551 |
|---|---|---|
| Core weight | 147.85 | 148.82 |
| Hot strength [N/cm$^2$] | 183 | 189 |
| One-hour strength [N/cm$^2$] | 483 | 505 |
| Moisture stability [min] | 2140 | 3220 |

Surprisingly, the results show that the use of potassium aluminate distinctly increases moisture stability once again compared to the use of sodium aluminate. Additional in-house studies have additionally shown that it also makes no difference whether the potassium comes from the liquid component (B) or (C) (results not shown here).

Example 16—Combined Use of Aluminate Ions and Various Microsilica Species

According to the procedure of example 5, molding material mixtures having a composition of liquid components (B) and (C) according to table 9a were produced; the (calculated) molar compositions present in a mixture of liquid components (B) and (C) (according to the formulation from table 9a) are reported in table 9b. Formulation 2019650 is an inventive example.

In a first series of experiments (2019650-1), the 1:1 mixture of "RW-Füller gesiebt" and "RW-Füller Q1 Plus" used in example 5 was used as the 0.6 PW of component (A) comprising particulate amorphous silicon dioxide.

In a second series of experiments (2019650-2), with an otherwise unchanged procedure from that in experiment series 2019650-1, rather than 0.6 PW of the 1:1 mixture, 0.6 PW of "RW-Füller Q1 Plus" was used (i.e. without "RW-Füller gesiebt").

In a third series of experiments (2019650-3), with an otherwise unchanged procedure from that in experiment series 2019650-1, rather than 0.6 PW of the 1:1 mixture, 0.6 PW of "RW-Füller gesiebt" was used (i.e. without "RW-Füller Q1 Plus").

Formulations 2019650-1, 2019650-2 and 2019650-3 relate to inventive examples.

TABLE 9a

|  | Liquid component | Formulation 2019650 |
|---|---|---|
| Water | (B) | 13.275 |
| NaOH 33% | (B) | 5.575 |
| KOH 45% | (B) | 2.600 |
| 48/50 HV waterglass | (B) | 65.900 |
| EHS surfactant | (B) | 0.150 |
| Potassium aluminate solution 1:2.5 | (C) | 12.500 |
| Total | (B) + (C) | 100.00 |

TABLE 9b

| Formulation | 2019650 |
|---|---|
| $H_2O$ [mol %] | 85.50 |
| $SiO_2$ [mol %] | 9.06 |
| $Na_2O$ [mol %] | 3.79 |
| $K_2O$ [mol %] | 1.25 |
| $Li_2O$ [mol %] |  |
| $B_2O_3$ [mol %] |  |
| $Al_2O_3$ [mol %] | 0.40 |
| MR | 1.80 |

According to the procedure from example 6, these molding material mixtures were used in each case to produce test bars.

For each of the series of experiments specified, a sufficient number of test bars were produced in order to determine core weight (according to example 7), hot strength (according to example 8), one-hour strength (according to example 9) and moisture stability (according to example 10); the results of these determinations are reported in table 10.

TABLE 10

|  | 2019650-1 | 2019650-2 | 2019650-3 |
|---|---|---|---|
| Core weight | 148.22 | 151.30 | 143.45 |
| Hot strength [$N/cm^2$] | 190 | 180 | 200 |
| One-hour strength [$N/cm^2$] | 500 | 520 | 460 |
| Moisture stability [min] | >15840[7] | 1363 | >15840[7] |

[7]The tests were stopped after 15 840 minutes.

Surprisingly, the results show that the use of at least one part of a particulate amorphous $SiO_2$ in component A that was produced in Si production by the reduction of quartz in an arc furnace ("RW-Füller gesiebt"), compared to the use of component A comprising, as particulate amorphous silicon dioxide, only such particulate amorphous $SiO_2$ that has been produced in the production of $ZrO_2$ by thermal decomposition of $ZrSiO_4$ ("RW-Füller Q1 Plus"), once again distinctly increases moisture stability above expectations.

Example 17—Stability Tests 17.1 A total of 4 combinations of a first liquid component (B) with a second liquid component (C) comprising sodium aluminate were produced. The compositions are apparent from tables 11a and 11b.

The respective (calculated) molar compositions are given in table 11c.

TABLE 11a

|  | Liquid component | Formulation 2019327 | Formulation 2019321 |
|---|---|---|---|
| Water | (B) | 13.10 | 12.70 |
| NaOH 33% | (B) | 15.50 | 12.90 |
| 48/50 HV waterglass | (B) | 67.65 | 67.40 |
| EHS surfactant | (B) | 0.50 | 0.50 |
| Sodium aluminate solution 1:2.5 | (C) | 3.25 | 6.50 |
| Total | (B) + (C) | 100.00 | 100.00 |

TABLE 11b

|  | Liquid component | Formulation 2019328 | Formulation 2019329 |
|---|---|---|---|
| Water | (B) | 12.20 | 11.80 |
| NaOH 33% | (B) | 10.40 | 7.90 |
| 48/50 HV waterglass | (B) | 67.15 | 66.90 |
| EHS surfactant | (B) | 0.50 | 0.50 |
| Sodium aluminate solution 1:2.5 | (C) | 9.75 | 12.90 |
| Total | (B) + (C) | 100.00 | 100.00 |

TABLE 11c

| Formulation | 2019327 | 2019321 | 2019328 | 2019329 |
|---|---|---|---|---|
| $H_2O$ [mol %] | 85.81 | 85.71 | 85.60 | 85.50 |
| $SiO_2$ [mol %] | 9.06 | 9.06 | 9.06 | 9.06 |
| $Na_2O$ [mol %] | 5.03 | 5.03 | 5.03 | 5.03 |
| $Al_2O_3$ [mol %] | 0.10 | 0.20 | 0.30 | 0.40 |
| MR | 1.80 | 1.80 | 1.80 | 1.80 |

17.2 A total of 4 combinations of a first liquid component (B) with a second liquid component (C) comprising potassium aluminate were produced. The compositions are apparent from tables 11d and 11e.

The respective (calculated) molar compositions are given in table 11f.

TABLE 11d

| | Liquid component | Formulation 2019684 | Formulation 2019644 |
|---|---|---|---|
| Water | (B) | 14.36 | 13.95 |
| NaOH 33% | (B) | 5.56 | 5.56 |
| KOH 45% | (B) | 10.21 | 7.70 |
| 48/50 HV waterglass | (B) | 66.62 | 66.35 |
| EHS surfactant | (B) | 0.15 | 0.15 |
| Potassium aluminate solution 1:2.5 | (C) | 3.10 | 6.20 |
| Total | (B) + (C) | 100.00 | 100.00 |

TABLE 11e

| | Liquid component | Formulation 2019647 | Formulation 2019650 |
|---|---|---|---|
| Water | (B) | 13.65 | 13.275 |
| NaOH 33% | (B) | 5.55 | 5.575 |
| KOH 45% | (B) | 5.10 | 2.600 |
| 48/50 HV waterglass | (B) | 66.15 | 65.900 |
| EHS surfactant | (B) | 0.15 | 0.150 |
| Potassium aluminate solution 1:2.5 | (C) | 9.40 | 12.500 |
| Total | (B) + (C) | 100.00 | 100.00 |

TABLE 11f

| | 2019684 | 2019644 | 2019647 | 2019650 |
|---|---|---|---|---|
| $H_2O$ [mol %] | 85.80 | 85.70 | 85.60 | 85.50 |
| $SiO_2$ [mol %] | 9.06 | 9.06 | 9.06 | 9.06 |
| $Na_2O$ [mol %] | 3.79 | 3.79 | 3.79 | 3.79 |
| $K_2O$ [mol %] | 1.25 | 1.25 | 1.25 | 1.25 |
| $Al_2O_3$ [mol %] | 0.10 | 0.20 | 0.30 | 0.40 |
| MR | 1.80 | 1.80 | 1.80 | 1.80 |

The combination according to formulations 2019327, 2019321, 2019328, 2019329, 2019684, 2019644, 2019647 and 201950 (as defined in tables 11a, 11b, 11d and 11e) was in each case introduced into a vessel, which was stored closed at room temperature (20° C.).

During the storage, the stability of the stored solutions was checked by inspection. As soon as precipitates and/or gel formation were observable by the naked eye, the solution was considered to be no longer stable from that juncture.

It was found that none of the samples tested was stable for longer than 6 months, and at least samples 2019329, 2019644, 2019467 and 2019550 were stable for less than 2 months.

Example 18—Comparison with the Use of a Particulate Aluminate Source

In this example, the particulate amorphous silicon dioxide species "RW-Füller gesiebt" (with a median of the particle size distribution, rounded to the second post-decimal place, determined by means of laser scattering, of 0.23 micrometer) was first dry-mixed with an amount of the particulate amorphous silicon dioxide species "RW-Fuller Q1 Plus" (with a median of the particle size distribution, rounded to the second post-decimal place, determined by means of laser scattering, of 0.84 micrometer) in a weight ratio of 1:1 to give a preliminary mixture (as an example of a component (A)). In a contacting vessel, 100 PW of H32 quartz sand (from Quarzwerke GmbH, AFS grain fineness number 45) and 0.6 PW of this preliminary mixture were mixed manually, so as to result in 100.6 parts by weight of a mixture of quartz sand (as an example of a mold base material (D)) and particulate amorphous silicon dioxide (component (A)).

In respective subsequent experiments, 100.6 parts by weight of that mixture together with 2.1 parts by weight in each case of (i) an aluminate ion-free waterglass binder (2019683) (cf. CE 18.1 in table 13; this is a component (B)), (ii) a mixture of powdery $AlOH_3$ (Apyral $NH_2O$) and a waterglass binder (20200138) in a mixing ratio of 0.05:2.05 (cf. CE 18.2 in table 13; mixing of these constituents results in a first liquid component (B) comprising waterglass, into which $AlOH_3$ has been mixed) and (iii) a mixture of binder constituents 2019666 (this is a component (B)) and 2019665 (this is a component (C)) in a mixing ratio of 1.78:0.32 (cf. E 18.3 in table 13; inventive example) were added to the mixture of quartz sand and particulate amorphous silicon dioxide; this was then followed straight away by mixing in each case at 220 rpm in a bull mixer (RN10/20 type, from Morek Multiserw) for 120 seconds.

The resultant molding material mixtures were each processed according to the procedure from the above example 6 to give test bars. For each of the mixtures described, a sufficient number of test bars were produced in order to determine core weight (according to example 7), hot strength (according to example 8), one-hour strength (according to example 9) and moisture stability (according to example 10); the results of these determinations are reported in table 14.

TABLE 13

| | CE 18.1 Used 2019683 (B) | CE 18.2 Part 1 Apyral NH 20 Apyral NH 20 | CE 18.2 Part 2 20200138 20200138 | CE 18.2 Used 2.05 PW 2020138 + 0.5 PW Apyral NH 20 (B) | E 18.3 Part 1 2019666 (B) | E 18.3 Part 2 2019665 (C) | E 18.3 Used 1.78 PW 2019666 + 0.32 PW 2019665 (B) + (C) |
|---|---|---|---|---|---|---|---|
| Component | | | | | | | |
| Water | 14.676 | | | 13.650 | 13.325 | 15.684 | — |
| NaOH 33% | 5.590 | | | 5.713 | 5.577 | 6.263 | — |
| KOH 45% | 12.780 | | | 12.900 | 12.593 | — | 2.00 |

TABLE 13-continued

| | CE 18.1 Used 2019683 (B) | CE 18.2 | | | E 18.3 | | |
|---|---|---|---|---|---|---|---|
| Component | | Part 1 Apyral NH 20 | Part 2 20200138 Apyral NH 20 | Used 2.05 PW 2020138 + 0.5 PW Apyral NH 20 (B) | Part 1 2019666 (B) | Part 2 2019665 (C) | Used 1.78 PW 2019666 + 0.32 PW 2019665 (B) + (C) |
| 48/50 waterglass | 66.820 | | 67.600 | 65.990 | 77.895 | 16.00 | |
| EHS | 0.134 | | 0.137 | 0.134 | 0.158 | — | |
| Al(OH)₃ | | 100 | | 2.381 | — | 82.00 | |
| Total | 100 | 100 | 100 | 100 | 100 | 100 | |
| H₂O [mol %] | 85.90 | 74.99 | 85.67 | 85.51 | | | 85.49 |
| SiO₂ [mol %] | 9.06 | 0.00 | 9.20 | 9.06 | | | 9.07 |
| Na₂O [mol %] | 3.79 | 0.00 | 3.85 | 3.79 | | | 3.80 |
| K₂O [mol %] | 1.25 | 0.00 | 1.27 | 1.25 | | | 1.24 |
| Al₂O₃ [mol %] | 0.00 | 25.01 | 0.00 | 0.38 | | | 0.40 |
| Total | 100 | 100 | 100 | 100.000 | | | 100.000 |

CE in this table means "comparative example"; E denotes an inventive example.

TABLE 14

| Binder | Core weight [g] | Hot strength [N/cm²] | One-hour strength [N/cm²] | Moisture stability [min] |
|---|---|---|---|---|
| CE 18.1 | 146.90 | 150 | 480 | 300 |
| CE 18.2 | 146.86 | 150 | 480 | 340 |
| B18.3 | 146.58 | 160 | 470 | >1440[9] |

[9] Experiments stopped after 1440 min.

It is apparent from the results that the mixture comprising powdery Al(OH)₃ (CE 18.2), by comparison with a mixture entirely devoid of Al(OH)₃ (CE 18.1), does not bring about any significant improvement in moisture stability (cf. example 10), whereas the mixture comprising dissolved Al(OH)₃ (E 18.3) considerably increases moisture stability.

Example 19—Variation of Aluminate Addition

Molding material mixtures from formulations 19.1-19.3, as apparent from table 15 below with reference to table 16, were used to create molding material mixtures analogously to example 5. The liquid components were added in such a way that they came into direct contact with one another only when the bull mixer was switched on.

TABLE 15

| Mixture | (D) | Addition [PW] | (B) | Addition [PW] | (C) | Addition [PW] | (A) | Addition [PW] |
|---|---|---|---|---|---|---|---|---|
| 19.1 | H32 | 100.00 | 20200253 | 1.58 | 20200252 | 0.52 | 2019409 | 0.60 |
| 19.2 | H32 | 100.00 | 20200255 | 1.68 | 20200254 | 0.42 | 2019409 | 0.60 |
| 19.3 | H32 | 100.00 | 20200257 | 1.68 | 20200256 | 0.42 | 2019409 | 0.60 |

TABLE 16

| Name | 20200252 | 20200253 | 20200253 + 20200252 as per 19.1 | 20200254 | 20200255 | 20200255 + 20200254 as per 19.2 | 2020056 | 20200257 | 20200257 + 20200256 as per 19.3 |
|---|---|---|---|---|---|---|---|---|---|
| H₂O [% by wt.] | 67.09 | 59.17 | 61.13 | 63.41 | 60.18 | 60.82 | 59.69 | 60.27 | 60.15 |
| SiO₂ [% by wt.] | 0.00 | 29.57 | 22.25 | 0.00 | 27.62 | 22.10 | 0.00 | 27.41 | 21.92 |
| Na₂O [% by wt.] | 19.05 | 11.07 | 13.05 | 16.64 | 12.13 | 13.03 | 15.55 | 12.25 | 12.91 |
| K₂O [% by wt.] | 7.26 | 0.11 | 1.88 | 9.45 | 0.00 | 1.89 | 9.26 | 0.00 | 1.85 |
| Al₂O₃ [% by wt.] | 6.60 | 0.00 | 1.63 | 10.50 | 0.00 | 2.10 | 15.50 | 0.00 | 3.10 |
| Remainder [% by wt.] | 0.00 | 0.07 | 0.05 | 0.00 | 0.07 | 0.06 | 0.00 | 0.07 | 0.06 |
| Total | 100.00 | 100.00 | 100.00 | 100.00 | 100.00 | 100.00 | 100.00 | 100.00 | 100.00 |
| MV | | | 1.61 | | | 1.60 | | | 1.60 |

For each of the formulations specified in table 15, a sufficient number of test bars were produced in order to determine core weight (according to example 7), hot strength (according to example 8), one-hour strength (according to example 9) and moisture stability (according to example 10); the results of this determination are reported in table 17.

TABLE 17

| Mixture | Core weight [g] | Hot strength [N/cm$^2$] | One-hour strength [N/cm$^2$] | Moisture stability [min] |
| --- | --- | --- | --- | --- |
| 19.1 | 147.6 | 140 | 430 | 1230 |
| 19.2 | 147.5 | 130 | 410 | 1670 |
| 19.3 | 147.1 | 130 | 350 | 5760 |

For mixtures 19.1 and 19.2 with an aluminate ion content (calculated as $Al_2O_3$) of 1.63% by weight and 2.1% by weight respectively (percentages by weight here are always based on the sum total of components (B) and (C) used), comparatively similar values are attained in each case for hot strength, one-hour strength, core weight and moisture stability. In the case of an $Al_2O_3$ content of 3.1% by weight (mixture 19.3), a significant rise in moisture stability/storage stability can be observed.

We claim:

1. A process for producing an article for use in the foundry industry, selected from the group consisting of molds, cores, feeder elements and molding material mixtures, said process comprising the following steps:
   (S1) producing or providing a binder system comprising the following components in three spatially separate vessels:
   a component (A) comprising particulate amorphous silicon dioxide,
   a first liquid component (B) comprising waterglass, and
   a second liquid component (C) comprising aluminate ions dissolved in an aqueous phase,
   (S2) contacting a mold base material (D) and constituents of all the said components (A), (B) and (C) of the binder system in predetermined ratios in one or more steps, so as to result in a molding material mixture in which the aluminate ions and the particulate amorphous silicon dioxide are mixed into the waterglass, wherein steps (S1) and (S2) are conducted in a facility for producing molding material mixtures.

2. The process as claimed in claim 1, wherein
the contacting of the mold base material (D) and constituents of all the said components (A), (B) and (C) of the binder system in predetermined ratios in one or more steps in step (S2) is conducted by using
an amount of the first liquid component (B) present as a constituent of the binder system in step (S1)
and/or
an amount of the second liquid component (C) present as a constituent of the binder system in step (S1)
and/or
selected constituents of the first liquid component (B) after separation of the first liquid component (B) present in step (S1) as a constituent of the binder system
and/or
selected constituents of the first liquid component (C) after separation of the second liquid component (C) present in step (S1) as a constituent of the binder system
in the contacting in step (S2),
and/or
wherein constituents and/or amounts of the first liquid component (B) and second liquid component (C) each present as a constituent of the binder system in step (S1), in step (S2),
are first mixed in a predetermined ratio, so as to result in a mixture comprising waterglass and aluminate ions in predetermined proportions, and then the mold base material (D) is contacted with this mixture,
or
not mixing before the mold base material (D) is contacted (i) fully simultaneously, (ii) partly simultaneously or (iii) in any sequence successively with constituents or amounts of the first liquid component (B) and the second liquid component (C).

3. The process as claimed in claim 1, wherein, in step (S2), constituents or amounts of the first liquid component (B) are added at an individually predetermined dosing rate and/or constituents or amounts of the second liquid component (C) at an individually predetermined dosing rate
   (i) to the mold base material (D)
   and/or
   (ii) to constituents or amounts of another component of the binder system, wherein the facility for production of molding material mixtures comprises:
   one or more dosing devices for metered addition of constituents or amounts of the first liquid component (B) and/or of constituents or amounts of the second liquid component (C) and/or of constituents or amounts of component (A) comprising particulate amorphous silicon dioxide and/or the mold base material (D)
   and
   an open-loop or closed-loop control device for the one dosing device or the multiple dosing devices.

4. The process as claimed in claim 1,
wherein the total mass of the constituents or amounts of the first liquid component (B) and of the constituents or amounts of the second liquid component (C) used in the contacting in step (S2) comprises:
15% to 35% by weight of silicon dioxide,
8% to 17% by weight of alkali metal oxide,
aluminate ions, calculated as $Al_2O_3$, in an amount up to 4.0% by weight,
where the percentages by weight are based on the total mass of the constituents or amounts of the first liquid component (B) and of the constituents or amounts of the second liquid component (C) used in the contacting in step (S2)
and/or
where, in the total mass of the constituents or amounts of the first liquid component (B) and constituents or amounts of the second liquid component (C) used in step (S2), the mass ratio of alkali metal oxide to $Al_2O_3$ is in the range from 35:1 to 3:1.

5. The process as claimed in claim 1,
wherein, in step (S2), the temperature of the constituents or amounts of the first liquid component (B) used and of the constituents or amounts of the second liquid component (C) used at the start of the contacting or mixing are each within a range from 5 to 35° C.
and/or
wherein, in the total mass of the constituents or amounts of the first liquid component (B) and constituents or amounts of the second liquid component (C) used in step (S2), the mass ratio of $Al_2O_3$ to $SiO_2$ is greater than 1:70.

6. The process as claimed in claim 1, wherein
constituents or amounts of component (A) comprising particulate amorphous silicon dioxide are contacted in step (S2) with the mold base material and with constituents or amounts of the first liquid component (B) and constituents or amounts of the second liquid component (C), wherein
component (A) used as a constituent of the binder system in step (S1)
  (i) is particulate, or
  (ii) is a suspension of particulate amorphous silicon dioxide
and/or
the constituents or amounts of component (A) used in step (S2), comprising particulate amorphous silicon dioxide, are used (i) in the form of a powder or granular material, or (ii) as a suspension
and/or
the particulate amorphous silicon dioxide of component (A) is used as a constituent in step (S2) and is selected from the group consisting of:
  particulate synthetic amorphous silicon dioxide containing silicon dioxide in a proportion of at least 80% by weight, based on the total mass of the particulate synthetic amorphous silicon dioxide, and at least carbon as secondary constituent;
  particulate synthetic amorphous silicon dioxide comprising oxidic zirconium as secondary constituent and preferably producible by thermal breakdown of $ZrSiO_4$;
  particulate synthetic amorphous silicon dioxide producible by oxidizing metallic silicon by means of an oxygenous gas;
  particulate synthetic amorphous silicon dioxide producible by quenching a silicon dioxide melt;
  fumed silica;
  and
  mixtures thereof
and/or
component (A) comprising particulate amorphous silicon dioxide additionally comprises one, two, three or more further constituents that are used as well in step (S2) and are independently selected from the group consisting of:
  particulate materials,
  water-soluble materials,
  alkali metal hydroxides,
  surfactants,
  film formers,
  hydrophobizing agents,
  and
  carbohydrates.

7. The process as claimed in claim 1, wherein the proportion of silicon dioxide in component (A) comprising particulate amorphous silicon dioxide based on the total mass of component (A) comprising particulate amorphous silicon dioxide.

8. The process as claimed in claim 1, wherein the first liquid component (B) and/or the second liquid component (C) present as a constituent of the binder system in step (S1) is/are used in step (S2) out of the respective vessel without further processing and/or
wherein the first liquid component (B) comprises one or more alkali metals M from the group consisting of lithium, sodium and potassium, where the proportion of potassium ions, calculated as $K_2O$, is greater than 0.1% by weight,
and/or
wherein the second liquid component (C) comprises one or more alkali metals M from the group consisting of lithium, sodium and potassium, where the proportion of potassium ions, calculated as $K_2O$, is preferably greater than 0.1% by weight,
and/or
wherein the total mass of the first liquid component (B) and of the second liquid component (C) comprises one or more alkali metals M from the group consisting of lithium, sodium and potassium, where the proportion of potassium ions, calculated as $K_2O$, is greater than 0.1% by weight,
and/or
wherein the first liquid component (B), comprises a content of alkali metal silicate in the range from 20% by weight to 60% by weight, based on the total mass of the first liquid component (B);
and/or
wherein the first liquid component (B) comprises waterglass with a molar $SiO_2$/alkali metal oxide modulus in the range from 1.6 to 4.0.

9. The process as claimed in claim 1,
wherein the first liquid component (B) and/or the second liquid component (C) additionally comprise(s) one, two or more further constituents that are used as well in step (S2) and are independently selected from the group consisting of:
surface-active substances,
alkali metal phosphates,
oxidic boron compounds,
and/or
wherein the second liquid component (C) comprises dissolved alkali metal aluminates that are used in step (S2),
and/or
wherein the first liquid component (B) comprises
  a content of aluminate ions, calculated as $Al_2O_3$, of not greater than 0.4% by weight,
  and/or
  a content of lithium ions, calculated as $LiO_2$, of not greater than 0.1% by weight,
  and/or
  a content of boron ions, calculated as $B_2O_3$, of not greater than 0.1% by weight,
  based in each case on the total mass of the first liquid component (B),
and/or
wherein the second liquid component (C) comprises
  in the aqueous phase, a content of aluminate ions, calculated as $Al_2O_3$, in the range from 0.4% by weight to 35% by weight,
  and/or
  a content of lithium ions, calculated as $LiO_2$, of not greater than 0.1% by weight,
  and/or
  a content of boron ions, calculated as $B_2O_3$, of not greater than 0.1% by weight,
  based in each case on the total mass of the second liquid component (C),
and/or
wherein the total mass of the constituents or amounts of the first liquid component (B) and constituents or amounts of the second liquid component (C) used in the contacting in step (S2) comprises
  a content of aluminate ions, calculated as $Al_2O_3$, in the range from 0.4% to 4.0% by weight, and/or a content of lithium ions, calculated as $LiO_2$, of not greater than 0.1% by weight, and/or a content of boron ions, calculated as $B_2O_3$, of not greater than 0.1% by weight, where the percentages by weight are based on the total mass of the constituents or amounts of the first liquid component (B) and of the constituents or amounts of the second liquid component (C) used in the contacting in step (S2).

10. The process as claimed in claim 1, wherein the article is produced in step (S2) using respective total masses of the mold base material (D) and of the respective constituents or amounts of component (A) comprising particulate amorphous silicon dioxide, of the first liquid component (B) and of the second liquid component (C), where:

0.1 to 3.0 parts by weight of component (A) comprising particulate amorphous silicon dioxide is used, based on 100 parts by weight of the total mass of the refractory mold base material (D) used, and/or constituents or amounts of the first liquid component (B) and constituents or amounts of the second liquid component (C) are used in the range from 0.5 to 20 parts by weight in total, based on 100 parts by weight of the amount of the refractory mold base material (D) used, and/or the ratio of the total mass of the constituents or amounts of the first liquid component (B) used to the total mass of the constituents or components of the second liquid component (C) used is in the range from 86:1 to 1:1.

11. The process as claimed in claim 1, comprising the steps of (S3) three-dimensionally shaping the molding material mixture, (S4) curing the binder, so as to result in a mold, a core or a feeder element, wherein, in step (S4), the curing, at least in portions, is effected at a temperature in the range from 100° C. to 300° C., and/or the shaped molding material mixture is heated in a heatable shaping mold and/or the shaped molding material mixture is heated by contact with hot air and/or the shaped molding material mixture is heated by action of microwaves and/or the shaped molding material mixture is heated by passage of current and/or the shaped molding material mixture is cured using carbon dioxide and/or the shaped molding material mixture is cured using esters.

* * * * *

UNITED STATES PATENT AND TRADEMARK OFFICE
CERTIFICATE OF CORRECTION

PATENT NO. : 12,337,376 B2  
APPLICATION NO. : 18/005411  
DATED : June 24, 2025  
INVENTOR(S) : Azghar Munshi et al.

Page 1 of 1

It is certified that error appears in the above-identified patent and that said Letters Patent is hereby corrected as shown below:

In the Claims

In Column 51, Line 55 of Claim 7 reads "particulate amorphous silicon dioxide based on the total" but should read -- particulate amorphous silicon dioxide is at least 25% by weight based on the total --

Signed and Sealed this  
Fourteenth Day of October, 2025

John A. Squires  
*Director of the United States Patent and Trademark Office*